United States Patent
Lee et al.

(10) Patent No.: US 11,818,597 B2
(45) Date of Patent: Nov. 14, 2023

(54) METHOD AND USER EQUIPMENT FOR MEASURING CHANNEL OCCUPANCY RATIO IN WIRELESS COMMUNICATION SYSTEM

(71) Applicant: LG ELECTRONICS INC., Seoul (KR)

(72) Inventors: Seungmin Lee, Seoul (KR); Hyukjin Chae, Seoul (KR); Kyuhwan Kwak, Seoul (KR)

(73) Assignee: LG ELECTRONICS INC., Seoul (KR)

(*) Notice: Subject to any disclaimer, the term of this patent is extended or adjusted under 35 U.S.C. 154(b) by 381 days.

(21) Appl. No.: 17/289,183

(22) PCT Filed: Oct. 8, 2019

(86) PCT No.: PCT/KR2019/013157
§ 371 (c)(1),
(2) Date: Apr. 27, 2021

(87) PCT Pub. No.: WO2020/091251
PCT Pub. Date: May 7, 2020

(65) Prior Publication Data
US 2021/0400509 A1    Dec. 23, 2021

Related U.S. Application Data

(60) Provisional application No. 62/754,607, filed on Nov. 2, 2018.

(51) Int. Cl.
*H04W 24/08* (2009.01)
*H04W 4/40* (2018.01)
(Continued)

(52) U.S. Cl.
CPC ............ *H04W 24/08* (2013.01); *B60W 30/00* (2013.01); *B60W 40/08* (2013.01); *B60W 50/10* (2013.01);
(Continued)

(58) Field of Classification Search
None
See application file for complete search history.

(56) References Cited

U.S. PATENT DOCUMENTS

2015/0334760 A1    11/2015    Satori et al.
2018/0234973 A1    8/2018    Lee et al.
(Continued)

FOREIGN PATENT DOCUMENTS

KR    1020180099750    9/2018
WO    2016163854    10/2016

OTHER PUBLICATIONS

PCT International Application No. PCT/KR2019/013157, International Search Report dated Jan. 16, 2020, 13 pages.
(Continued)

*Primary Examiner* — Diane L Lo
(74) *Attorney, Agent, or Firm* — LEE, HONG, DEGERMAN, KANG & WAIMEY PC

(57) ABSTRACT

An embodiment of the present disclosure proposes a method for a first user equipment (UE) to measure a channel occupancy ratio (CR) in a wireless communication system, the method including: a step in which the first UE transmits a signal to a second UE; and a step in which the first UE measures the CR on the basis of the amount of resources for signal transmission, wherein the CR is measured by using at least any one among a scaling value and a bias value which are set on the basis of a comparison result between the transmission power for transmitting the signal and a threshold. The UE is capable of communicating with at least one
(Continued)

of another UE, a UE related to an autonomous driving vehicle, the BS or a network.

15 Claims, 18 Drawing Sheets

(51) Int. Cl.
*B60W 60/00* (2020.01)
*B60W 30/00* (2006.01)
*B60W 40/08* (2012.01)
*B60W 50/10* (2012.01)

(52) U.S. Cl.
CPC .......... *B60W 60/0053* (2020.02); *H04W 4/40* (2018.02); *B60W 2556/45* (2020.02)

(56) References Cited

U.S. PATENT DOCUMENTS

| | | | |
|---|---|---|---|
| 2020/0145867 A1* | 5/2020 | Tseng | H04W 24/10 |
| 2021/0099901 A1* | 4/2021 | Huang | H04L 1/1812 |
| 2021/0219268 A1* | 7/2021 | Li | H04W 72/20 |

OTHER PUBLICATIONS

Intel Corporation, "Details of Congestion control for V2V communication," 3GPP TSG RAN WG1 Meeting #88, R1-1702142, Feb. 2017, 7 pages.

\* cited by examiner (a) DMRS location for Rel. 12/13 PSBCH (b) DMRS location for V2V PSBCH (a)

(b)

(a)

(b)

METHOD AND USER EQUIPMENT FOR MEASURING CHANNEL OCCUPANCY RATIO IN WIRELESS COMMUNICATION SYSTEM

CROSS-REFERENCE TO RELATED APPLICATIONS

This application is the National Stage filing under 35 U.S.C. 371 of International Application No. PCT/KR2019/013157, filed on Oct. 8, 2019, which claims the benefit of U.S. Provisional Application No. 62/754,607, filed on Nov. 2, 2018, the contents of which are all hereby incorporated by reference herein in their entirety.

TECHNICAL FIELD

The following description relates to a wireless communication system, and more particularly, to a method of measuring a channel occupancy ratio and user equipment for the same. The preset disclosure deals with matter applicable to a wireless communication system, and more particularly, to a 3GPP-based wireless communication system. Specifically, the present disclosure deals with matter for a transmitting and receiving process in sidelink for performing D2D communication. The matter in the present disclosure is non-limited to the corresponding system but the corresponding matter may operate by applying to other communication systems.

BACKGROUND ART

As more and more communication devices demand larger communication capacities, the need for enhanced mobile broadband communication relative to the legacy radio access technologies (RATs) has emerged. Massive machine type communication (mMTC) that provides various services by interconnecting multiple devices and things irrespective of time and place is also one of main issues to be addressed for future-generation communications. A communication system design considering services/user equipments (UEs) sensitive to reliability and latency is under discussion as well. As such, the introduction of a future-generation RAT considering enhanced mobile broadband (eMBB), mMTC, ultra-reliability and low latency communication (URLLC), and so on is being discussed. For convenience, this technology is referred to as new RAT (NR) in the present disclosure. NR is an exemplary 5th generation (5G) RAT.

A new RAT system including NR adopts orthogonal frequency division multiplexing (OFDM) or a similar transmission scheme. The new RAT system may use OFDM parameters different from long term evolution (LTE) OFDM parameters. Further, the new RAT system may have a larger system bandwidth (e.g., 100 MHz), while following the legacy LTE/LTE-advanced (LTE-A) numerology. Further, one cell may support a plurality of numerologies in the new RAT system. That is, UEs operating with different numerologies may co-exist within one cell.

Vehicle-to-everything (V2X) is a communication technology of exchanging information between a vehicle and another vehicle, a pedestrian, or infrastructure. V2X may cover four types of communications such as vehicle-to-vehicle (V2V), vehicle-to-infrastructure (V2I), vehicle-to-network (V2N), and vehicle-to-pedestrian (V2P). V2X communication may be provided via a PC5 interface and/or a Uu interface.

DISCLOSURE

Technical Task

The present disclosure proposes a method of effectively controlling a congestion situation in D2D communication.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solutions

In one technical aspect of the present disclosure, provided is a method of measuring a Channel Occupancy Ratio (CR) by a first user equipment in a wireless communication system, the method including transmitting by the first user equipment a signal to a second user equipment and measuring by the first user equipment the channel occupancy ratio based on a resource amount for signal transmission, wherein the channel occupancy ratio may be measured based on at least one of a scaling value or a bias value configured based on a result from comparing a transmission power for the signal transmission and a threshold with each other.

In the above method, based on the transmission power less than the threshold, the scaling value greater than 0 and smaller than 1 may be used. Based on the transmission power equal to or more than the threshold, the scaling value of 1 may be used.

The method may further include receiving information indicating scaling values respectively mapped for a plurality of transmission power ranges from a base station and measuring the channel occupancy ratio based on the scaling value selected based on the information.

The at least one of the scaling value or the bias value may be determined based on a type or priority of a service related to the transmitted signal.

The method may further include measuring an average transmission power during a time interval for measuring the channel occupancy ratio and measuring the channel occupancy ratio based on the measured average transmission power.

The channel occupancy ratio may be measured based on a size of a coverage of the first user equipment.

The method may further include receiving control information indicating at least one of a distance between the first user equipment and the second user equipment or success/failure in signal reception from the second user equipment through physical layer signaling or higher layer signaling.

The coverage may be calculated in consideration of at least one of the transmission power, Modulation and Coding Scheme (MCS), or a payload size.

The channel occupancy ratio may be measured in further consideration of a resource for reception of a feedback signal for the transmitted signal.

In another technical aspect of the present disclosure, provided is a first user equipment measuring a Channel Occupancy Ratio (CR) in a wireless communication system, the first user equipment including a transceiver and a processor.

The processor may transmit a signal to a second user equipment and measure the channel occupancy ratio based on a resource amount for signal transmission, and the channel occupancy ratio may be measured based on at least one of a scaling value or a bias value configured based on a result from comparing a transmission power for the signal transmission and a threshold with each other.

Advantageous Effects

According to one embodiment of the present disclosure, a User Equipment (UE) may use more transmission resources when using small transmission power less than a predetermined threshold.

According to one embodiment of the present disclosure, when different transmission powers are used between UEs through the proposed scheme, fair CR measurement and fair congestion control may be performed between the UEs.

It will be appreciated by persons skilled in the art that the effects that could be achieved with the present disclosure are not limited to what has been particularly described hereinabove and other advantages of the present disclosure will be more clearly understood from the following detailed description.

DESCRIPTION OF DRAWINGS

The accompanying drawings, which are included to provide a further understanding of the present disclosure and are incorporated in and constitute a part of this application, illustrate embodiments of the present disclosure and together with the description serve to explain the principle of the disclosure.

BEST MODE FOR DISCLOSURE

Figure 1:
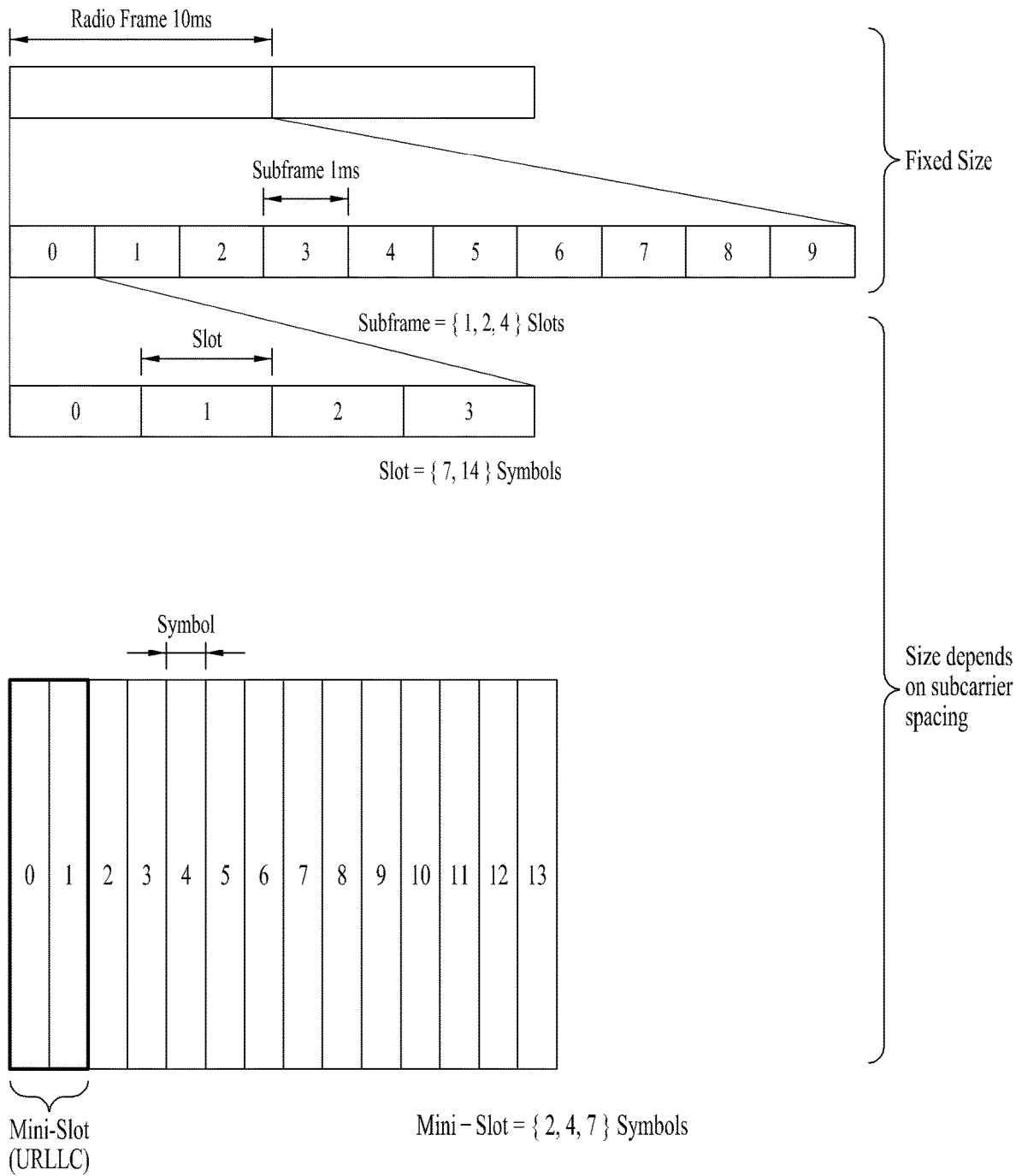
FIG. 1 illustrates a frame structure in new radio (NR).

In this document, downlink (DL) communication refers to communication from a base station (BS) to a user equipment (UE), and uplink (UL) communication refers to communication from the UE to the BS. In DL, a transmitter may be a part of the BS and a receiver may be a part of the UE. In UL, a transmitter may be a part of the UE and a receiver may be a part of the BS. Herein, the BS may be referred to as a first communication device, and the UE may be referred to as a second communication device. The term 'BS' may be replaced with 'fixed station', 'Node B', 'evolved Node B (eNB)', 'next-generation node B (gNB)', 'base transceiver system (BTS)', 'access point (AP)', 'network node', 'fifth-generation (5G) network node', 'artificial intelligence (AI) system', 'road side unit (RSU)', 'robot', etc. The term 'UE' may be replaced with 'terminal', 'mobile station (MS)', 'user terminal (UT)', 'mobile subscriber station (MSS)', 'subscriber station (SS)', 'advanced mobile station (AMS)', 'wireless terminal (WT)', 'machine type communication (MTC) device', 'machine-to-machine (M2M) device', 'device-to-device (D2D) device', 'vehicle', 'robot', 'AI module', etc.

The technology described herein is applicable to various wireless access systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA may be implemented as radio technology such as universal terrestrial radio access (UTRA) or CDMA2000. The TDMA may be implemented as radio technology such as global system for mobile communications (GSM), general packet radio service (GPRS), or enhanced data rates for GSM evolution (EDGE). The OFDMA may be implemented as radio technology such as the Institute of Electrical and Electronics Engineers (IEEE) 802.11 (Wi-Fi), IEEE 802.16 (WiMAX), IEEE 802-20, evolved UTRA (E-UTRA), etc. The UTRA is a part of a universal mobile telecommunication system (UMTS). 3rd generation partnership project (3GPP) long term evolution (LTE) is a part of evolved UMTS (E-UMTS) using E-UTRA. LTE-advance (LTE-A) or LTE-A pro is an evolved version of 3GPP LTE. 3GPP new radio or new radio access technology (3GPP NR) is an evolved version of 3GPP LTE, LTE-A, or LTE-A pro.

Although the present disclosure is described based on 3GPP communication systems (e.g., LTE-A, NR, etc.) for clarity of description, the spirit of the present disclosure is not limited thereto. LTE refers to technologies beyond 3GPP technical specification (TS) 36.xxx Release 8. In particular, LTE technologies beyond 3GPP TS 36.xxx Release 10 are referred to as LTE-A, and LTE technologies beyond 3GPP TS 36.xxx Release 13 are referred to as LTE-A pro. 3GPP NR refers to technologies beyond 3GPP TS 38.xxx Release 15. LTE/NR may be called '3GPP system'. Herein, "xxx" refers to a standard specification number.

In the present disclosure, a node refers to a fixed point capable of transmitting/receiving a radio signal for communication with a UE. Various types of BSs may be used as the node regardless of the names thereof. For example, the node may include a BS, a node B (NB), an eNB, a pico-cell eNB (PeNB), a home eNB (HeNB), a relay, a repeater, etc. A device other than the BS may be the node. For example, a radio remote head (RRH) or a radio remote unit (RRU) may be the node. The RRH or RRU generally has a lower power level than that of the BS. At least one antenna is installed for each node. The antenna may refer to a physical antenna or mean an antenna port, a virtual antenna, or an antenna group. The node may also be referred to as a point.

In the present disclosure, a cell refers to a prescribed geographical area in which one or more nodes provide communication services or a radio resource. When a cell refers to a geographical area, the cell may be understood as the coverage of a node where the node is capable of providing services using carriers. When a cell refers to a radio resource, the cell may be related to a bandwidth (BW), i.e., a frequency range configured for carriers. Since DL coverage, a range within which the node is capable of transmitting a valid signal, and UL coverage, a range within which the node is capable of receiving a valid signal from the UE, depend on carriers carrying the corresponding signals, the coverage of the node may be related to the coverage of the cell, i.e., radio resource used by the node. Accordingly, the term "cell" may be used to indicate the service coverage of a node, a radio resource, or a range to which a signal transmitted on a radio resource can reach with valid strength.

In the present disclosure, communication with a specific cell may mean communication with a BS or node that provides communication services to the specific cell. In addition, a DL/UL signal in the specific cell refers to a DL/UL signal from/to the BS or node that provides communication services to the specific cell. In particular, a cell providing DL/UL communication services to a UE may be called a serving cell. The channel state/quality of the specific cell may refer to the channel state/quality of a communication link formed between the BS or node, which provides communication services to the specific cell, and the UE.

When a cell is related to a radio resource, the cell may be defined as a combination of DL and UL resources, i.e., a combination of DL and UL component carriers (CCs). The cell may be configured to include only DL resources or a combination of DL and UL resources. When carrier aggregation is supported, a linkage between the carrier frequency of a DL resource (or DL CC) and the carrier frequency of a UL resource (or UL CC) may be indicated by system information transmitted on a corresponding cell. The carrier frequency may be equal to or different from the center frequency of each cell or CC. A cell operating on a primary frequency may be referred to as a primary cell (PCell) or PCC, and a cell operating on a secondary frequency may be referred to as a secondary cell (SCell) or SCC. The SCell may be configured after the UE and BS establish a radio resource control (RRC) connection therebetween by performing an RRC connection establishment procedure, that is, after the UE enters the RRC_CONNECTED state. The RRC connection may mean a path that enables the RRC of the UE and the RRC of the BS to exchange an RRC message. The SCell may be configured to provide additional radio resources to the UE. The SCell and the PCell may form a set of serving cells for the UE depending on the capabilities of the UE. When the UE is not configured with carrier aggregation or does not support the carrier aggregation although the UE is in the RRC_CONNECTED state, only one serving cell configured with the PCell exists.

A cell supports a unique radio access technology (RAT). For example, transmission/reception in an LTE cell is performed based on the LTE RAT, and transmission/reception in a 5G cell is performed based on the 5G RAT.

The carrier aggregation is a technology for combining a plurality of carriers each having a system BW smaller than a target BW to support broadband. The carrier aggregation is different from OFDMA in that in the former, DL or UL communication is performed on a plurality of carrier frequencies each forming a system BW (or channel BW) and in the latter, DL or UL communication is performed by dividing a base frequency band into a plurality of orthogonal subcarriers and loading the subcarriers in one carrier frequency. For example, in OFDMA or orthogonal frequency division multiplexing (OFDM), one frequency band with a predetermined system BW is divided into a plurality of subcarriers with a predetermined subcarrier spacing, and information/data is mapped to the plurality of subcarriers. Frequency up-conversion is applied to the frequency band to which the information/data is mapped, and the information/data is transmitted on the carrier frequency in the frequency band. In wireless carrier aggregation, multiple frequency bands, each of which has its own system BW and carrier frequency, may be simultaneously used for communication, and each frequency band used in the carrier aggregation may be divided into a plurality of subcarriers with a predetermined subcarrier spacing.

3GPP communication specifications define DL physical channels corresponding to resource elements carrying information originating from higher (upper) layers of physical layers (e.g., a medium access control (MAC) layer, a radio link control (RLC) layer, a protocol data convergence protocol (PDCP) layer, an RRC layer, a service data adaptation protocol (SDAP) layer, a non-access stratum (NAS) layer, etc.) and DL physical signals corresponding to resource elements which are used by physical layers but do not carry information originating from higher layers. For example, a physical downlink shared channel (PDSCH), a physical broadcast channel (PBCH), a physical multicast channel (PMCH), a physical control format indicator channel (PCFICH), and a physical downlink control channel (PDCCH) are defined as the DL physical channels, and a reference signal and a synchronization signal are defined as the DL physical signals. A reference signal (RS), which is called a pilot signal, refers to a predefined signal with a specific waveform known to both the BS and UE. For example, a cell-specific RS (CRS), a UE-specific RS (UE-RS), a positioning RS (PRS), a channel state information RS (CSI-RS), and a demodulation reference signal (DMRS) may be defined as DL RSs. In addition, the 3GPP communication specifications define UL physical channels corresponding to resource elements carrying information originating from higher layers and UL physical signals corresponding to resource elements which are used by physical layers but do not carry information originating from higher layers. For example, a physical uplink shared channel (PUSCH), a physical uplink control channel (PUCCH), and a physical random access channel (PRACH) are defined as the UL physical channels, and a demodulation reference signal (DMRS) for a UL control/data signal and a sounding reference signal (SRS) used for UL channel measurement are defined as the UL physical signals.

In the present disclosure, the PDCCH and the PDSCH may refer to a set of time-frequency resources or resource elements carrying downlink control information (DCI) of the physical layer and a set of time-frequency resources or resource elements carrying DL data thereof, respectively. The PUCCH, the PUSCH, and the PRACH may refer to a set of time-frequency resources or resource elements carrying uplink control information (UCI) of the physical layer, a set of time-frequency resources or resource elements carrying UL data thereof, and a set of time-frequency resources or resource elements carrying random access signals thereof, respectively. When it is said that a UE transmits a UL physical channel (e.g., PUCCH, PUSCH, PRACH, etc.), it may mean that the UE transmits DCI, UL data, or a random access signal on or over the corresponding UL physical channel. When it is said that the BS receives a UL physical channel, it may mean that the BS receives DCI, UL data, a random access signal on or over the corresponding UL physical channel. When it is said that the BS transmits a DL physical channel (e.g., PDCCH, PDSCH, etc.), it may mean that the BS transmits DCI or UL data on or over the corresponding DL physical channel. When it is said that the UE receives a DL physical channel, it may mean that the UE receives DCI or UL data on or over the corresponding DL physical channel.

In the present disclosure, a transport block may mean the payload for the physical layer. For example, data provided from the higher layer or MAC layer to the physical layer may be referred to as the transport block.

In the present disclosure, hybrid automatic repeat request (HARQ) may mean a method used for error control. A HARQ acknowledgement (HARQ-ACK) transmitted in DL is used to control an error for UL data, and a HARQ-ACK transmitted in UL is used to control an error for DL data. A transmitter that performs the HARQ operation waits for an ACK signal after transmitting data (e.g. transport blocks or codewords). A receiver that performs the HARQ operation transmits an ACK signal only when the receiver correctly receives data. If there is an error in the received data, the receiver transmits a negative ACK (NACK) signal. Upon receiving the ACK signal, the transmitter may transmit (new) data but, upon receiving the NACK signal, the transmitter may retransmit the data. Meanwhile, there may be a time delay until the BS receives ACK/NACK from the UE and retransmits data after transmitting scheduling information and data according to the scheduling information. The time delay occurs due to a channel propagation delay or a time required for data decoding/encoding. Accordingly, if new data is transmitted after completion of the current HARQ process, there may be a gap in data transmission due to the time delay. To avoid such a gap in data transmission during the time delay, a plurality of independent HARQ processes are used. For example, when there are 7 transmission occasions between initial transmission and retransmission, a communication device may perform data transmission with no gap by managing 7 independent HARQ processes. When the communication device uses a plurality of parallel HARQ processes, the communication device may successively perform UL/DL transmission while waiting for HARQ feedback for previous UL/DL transmission.

In the present disclosure, CSI collectively refers to information indicating the quality of a radio channel (also called a link) created between a UE and an antenna port. The CSI includes at least one of a channel quality indicator (CQI), a precoding matrix indicator (PMI), a CSI-RS resource indicator (CRI), an SSB resource indicator (SSBRI), a layer indicator (LI), a rank indicator (RI), or a reference signal received power (RSRP).

In the present disclosure, frequency division multiplexing (FDM) may mean that signals/channels/users are transmitted/received on different frequency resources, and time division multiplexing (TDM) may mean that signals/channels/users are transmitted/received on different time resources.

In the present disclosure, frequency division duplex (FDD) refers to a communication scheme in which UL communication is performed on a UL carrier and DL communication is performed on a DL carrier linked to the UL carrier, and time division duplex (TDD) refers to a communication scheme in which UL and DL communication are performed by splitting time.

The details of the background, terminology, abbreviations, etc. used herein may be found in documents published before the present disclosure. For example, 3GPP TS 24 series, 3GPP TS 34 series, and 3GPP TS 38 series may be referenced (http://www.3gpp.org/specifications/specification-numbering).

Frame Structure

FIG. 1 is a diagram illustrating a frame structure in NR.

The NR system may support multiple numerologies. The numerology is defined by a subcarrier spacing and cyclic prefix (CP) overhead. A plurality of subcarrier spacings may be derived by scaling a basic subcarrier spacing by an integer N (or $\mu$). The numerology may be selected independently of the frequency band of a cell although it is assumed that a small subcarrier spacing is not used at a high carrier frequency. In addition, the NR system may support various frame structures based on the multiple numerologies.

Hereinafter, an OFDM numerology and a frame structure, which may be considered in the NR system, will be described. Table 1 shows multiple OFDM numerologies supported in the NR system. The value of $\mu$ for a bandwidth part and a CP may be obtained by RRC parameters provided by the BS.

TABLE 1

| $\mu$ | $\Delta f = 2^{\mu} \cdot 15$ [kHz] | Cyclic prefix(CP) |
| --- | --- | --- |
| 0 | 15 | Normal |
| 1 | 30 | Normal |
| 2 | 60 | Normal, Extended |
| 3 | 120 | Normal |
| 4 | 240 | Normal |

The NR system supports multiple numerologies (e.g., subcarrier spacings) to support various 5G services. For example, the NR system supports a wide area in conventional cellular bands in a subcarrier spacing of 15 kHz and supports a dense urban environment, low latency, and wide carrier BW in a subcarrier spacing of 30/60 kHz. In a subcarrier spacing of 60 kHz or above, the NR system supports a BW higher than 24.25 GHz to overcome phase noise.

Resource Grid

Figure 2:
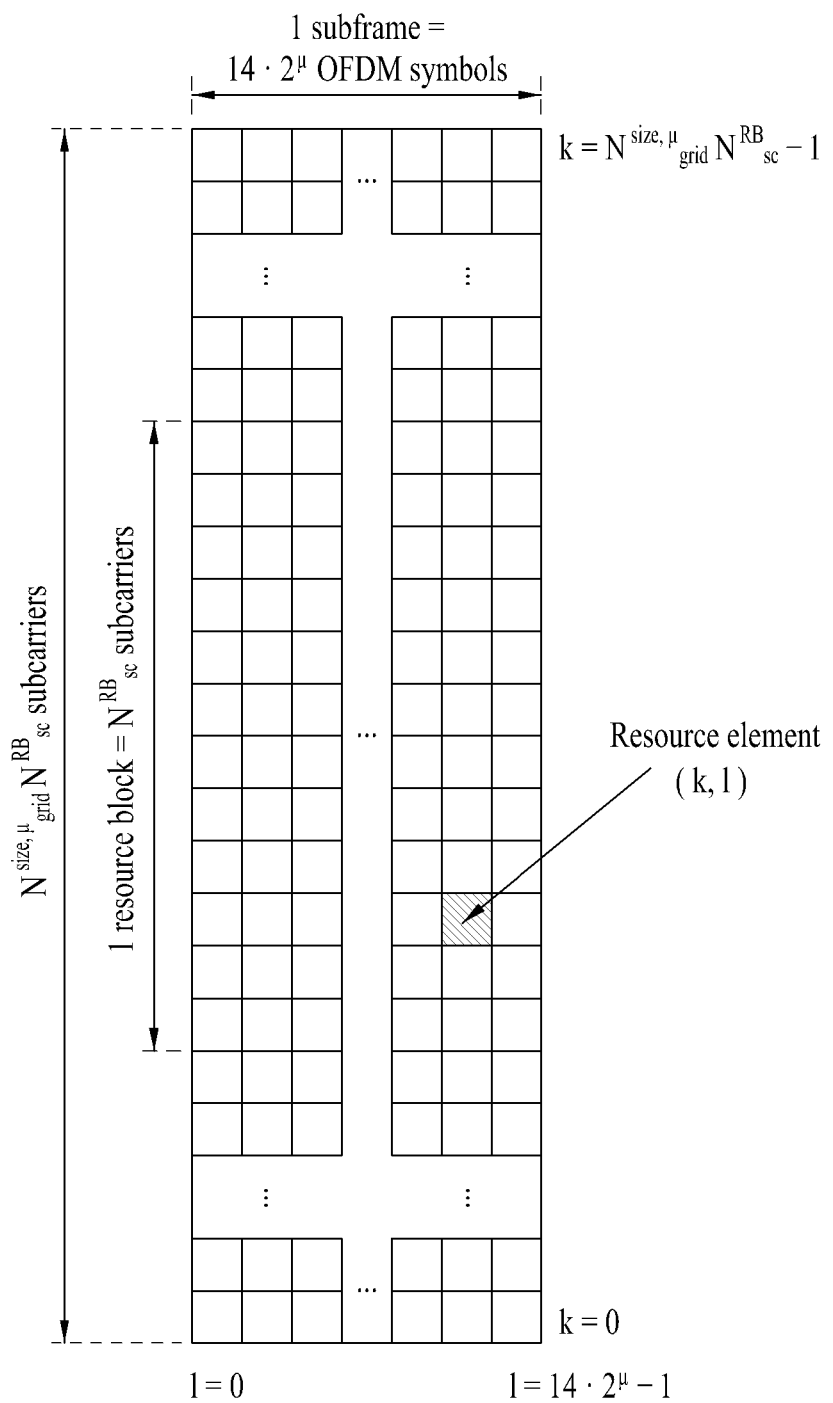
FIG. 2 illustrates a resource grid in NR.

FIG. 2 illustrates a resource grid in the NR.

Referring to FIG. 2, a resource grid consisting of $N^{size,\mu}_{grid} * N^{RB}_{sc}$ subcarriers and $14*2\mu$ OFDM symbols may be defined for each subcarrier spacing configuration and carrier, where $N^{size,\mu}_{grid}$ is indicated by RRC signaling from the BS. $N^{size,\mu}_{grid}$ may vary not only depending on the subcarrier spacing configuration $\mu$ but also between UL and DL. One resource grid exists for the subcarrier spacing configuration $\mu$, an antenna port p, and a transmission direction (i.e., UL or DL). Each element in the resource gird for the subcarrier spacing configuration $\mu$ and the antenna port p may be referred to as a resource element and identified uniquely by an index pair of (k, l), where k denotes an index in the frequency domain and l denotes the relative location of a symbol in the frequency domain with respect to a reference point. The resource element (k, l) for the subcarrier spacing configuration $\mu$ and the antenna port p may be a physical resource and a complex value, $a^{(p,\mu)}_{k,l}$. A resource block (RB) is defined as $N^{RB}_{sc}$ consecutive subcarriers in the frequency domain (where $N^{RB}_{sc}=12$).

Considering that the UE is incapable of supporting a wide BW supported in the NR system, the UE may be configured to operate in a part of the frequency BW of a cell (hereinafter referred to as a bandwidth part (BWP)).

Bandwidth Part (BWP)

The NR system may support up to 400 MHz for each carrier. If the UE always keeps a radio frequency (RF) module on for all carriers while operating on such a wideband carrier, the battery consumption of the UE may increase. Considering multiple use cases (e.g., eMBB, URLLC, mMTC, V2X, etc.) operating in one wideband carrier, a different numerology (e.g., subcarrier spacing) may be supported for each frequency band of the carrier. Further, considering that each UE may have a different capability regarding the maximum BW, the BS may instruct the UE to operate only in a partial BW rather than the whole BW of the wideband carrier. The partial bandwidth is referred to as the BWP. The BWP is a subset of contiguous common RBs defined for numerology μi in BWP i of the carrier in the frequency domain, and one numerology (e.g., subcarrier spacing, CP length, and/or slot/mini-slot duration) may be configured for the BWP.

The BS may configure one or more BWPs in one carrier configured for the UE. Alternatively, if UEs are concentrated in a specific BWP, the BS may move some UEs to another BWP for load balancing. For frequency-domain inter-cell interference cancellation between neighbor cells, the BS may configure BWPs on both sides of a cell except for some central spectra in the whole BW in the same slot. That is, the BS may configure at least one DL/UL BWP for the UE associated with the wideband carrier, activate at least one of DL/UL BWP(s) configured at a specific time (by L1 signaling which is a physical-layer control signal, a MAC control element (CE) which is a MAC-layer control signal, or RRC signaling), instruct the UE to switch to another configured DL/UL BWP (by L1 signaling, a MAC CE, or RRC signaling), or set a timer value and switch the UE to a predetermined DL/UL BWP upon expiration of the timer value. In particular, an activated DL/UL BWP is referred to as an active DL/UL BWP. While performing initial access or before setting up an RRC connection, the UE may not receive a DL/UL BWP configuration. A DL/UL BWP that the UE assumes in this situation is referred to as an initial active DL/UL BWP.

Synchronization Acquisition of Sidelink UE

In time division multiple access (TDMA) and frequency division multiple access (FDMA) systems, accurate time and frequency synchronization is essential. If time and frequency synchronization is not accurate, inter-symbol interference (ISI) and inter-carrier interference (ICI) may occur so that system performance may be degraded. This may occur in V2X. For time/frequency synchronization in V2X, a sidelink synchronization signal (SLSS) may be used in the physical layer, and master information block-sidelink-V2X (MIB-SL-V2X) may be used in the RLC layer.

Figure 3:
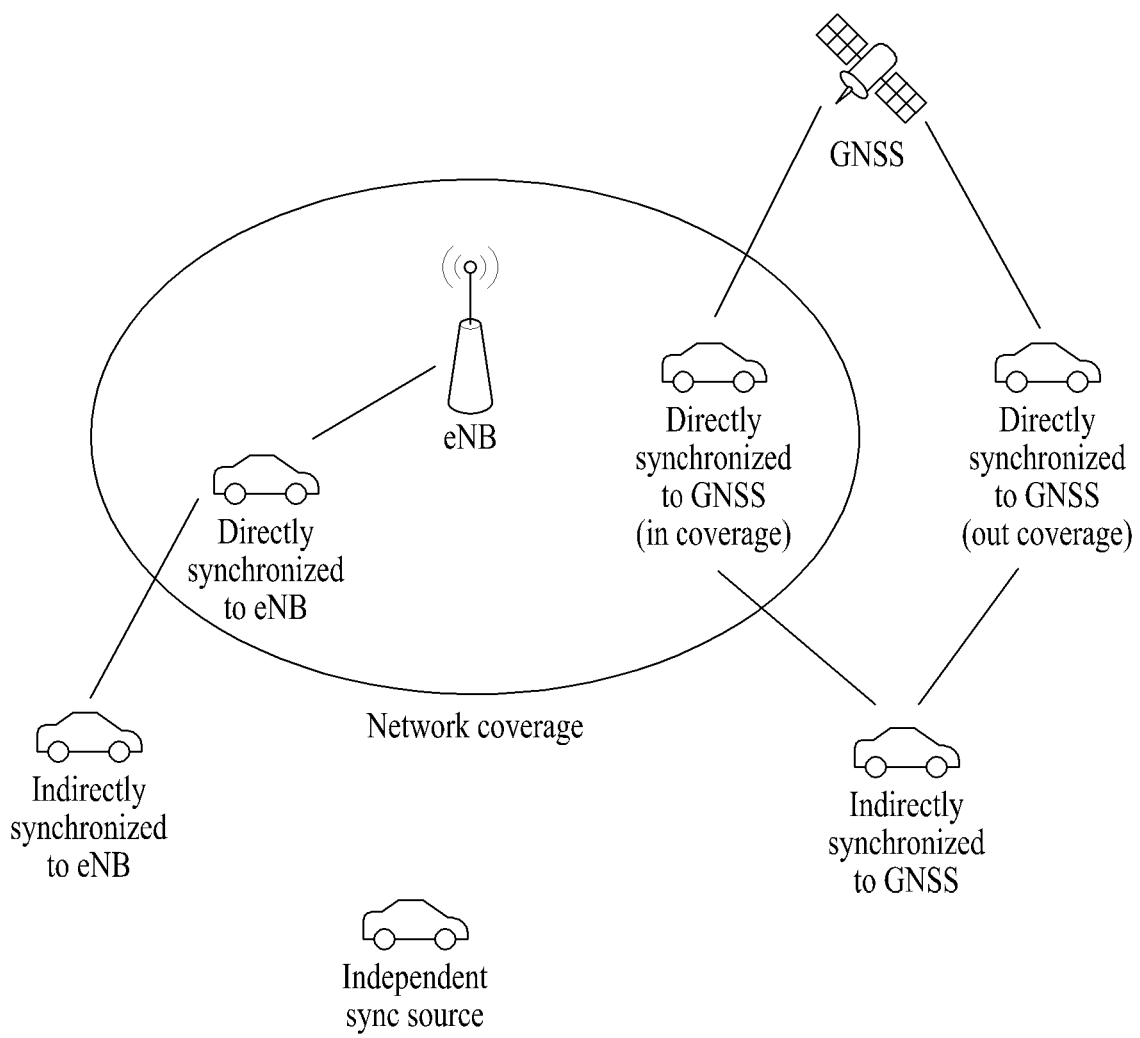
FIG. 3 illustrates sidelink synchronization.

FIG. 3 illustrates a synchronization source and a synchronization reference in V2X.

Referring to FIG. 3, in V2X, a UE may be directly synchronized to global navigation satellite systems (GNSS) or indirectly synchronized to the GNSS through another UE (in or out of the network coverage) that is directly synchronized to the GNSS. When the GNSS is set to the synchronization source, the UE may calculate a direct frame number (DFN) and a subframe number based on coordinated universal time (UTC) and a (pre)configured DFN offset.

Alternatively, the UE may be directly synchronized to the BS or synchronized to another UE that is time/frequency synchronized to the BS. For example, if the UE is in the coverage of the network, the UE may receive synchronization information provided by the BS and be directly synchronized to the BS. Thereafter, the UE may provide the synchronization information to another adjacent UE. If the timing of the BS is set to the synchronization reference, the UE may follow a cell associated with a corresponding frequency (if the UE is in the cell coverage at the corresponding frequency) or follow a PCell or serving cell (if the UE is out of the cell coverage at the corresponding frequency) for synchronization and DL measurement.

The serving cell (BS) may provide a synchronization configuration for carriers used in V2X sidelink communication. In this case, the UE may follow the synchronization configuration received from the BS. If the UE detects no cell from the carriers used in the V2X sidelink communication and receives no synchronization configuration from the serving cell, the UE may follow a predetermined synchronization configuration.

Alternatively, the UE may be synchronized to another UE that fails to directly or indirectly obtain the synchronization information from the BS or GNSS. The synchronization source and preference may be preconfigured for the UE or configured in a control message from the BS.

Hereinbelow, the SLSS and synchronization information will be described.

The SLSS may be a sidelink-specific sequence and include a primary sidelink synchronization signal (PSSS) and a secondary sidelink synchronization signal (SSSS).

Each SLSS may have a physical layer sidelink synchronization identity (ID), and the value may be, for example, any of 0 to 335. The synchronization source may be identified depending on which of the above values is used. For example, 0, 168, and 169 may indicate the GNSS, 1 to 167 may indicate the BS, and 170 to 335 may indicate out-of-coverage. Alternatively, among the values of the physical layer sidelink synchronization ID, 0 to 167 may be used by the network, and 168 to 335 may be used for the out-of-coverage state.

Figure 4:
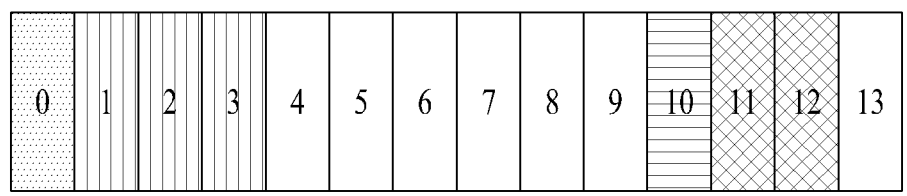
FIG. 4 illustrates a time resource unit for transmitting a sidelink synchronization signal.
Figure 4:
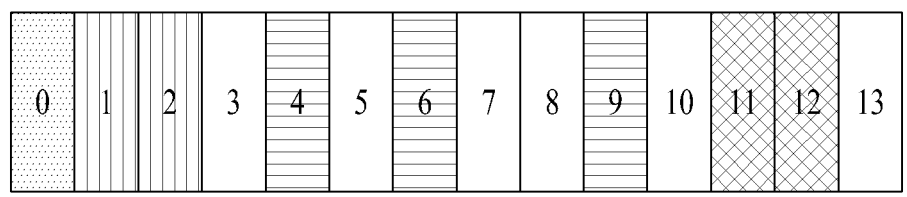
Figure 4:
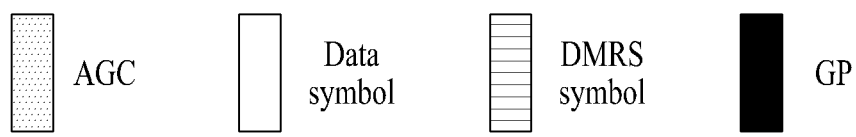
Figure 4:
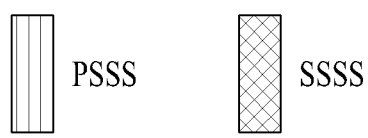

FIG. 4 illustrates a time resource unit for SLSS transmission. The time resource unit may be a subframe in LTE/LTE-A and a slot in 5G. The details may be found in 3GPP TS 36 series or 3GPP TS 28 series. A physical sidelink broadcast channel (PSBCH) may refer to a channel for carrying (broadcasting) basic (system) information that the UE needs to know before sidelink signal transmission and reception (e.g., SLSS-related information, a duplex mode (DM), a TDD UL/DL configuration, information about a resource pool, the type of an SLSS-related application, a subframe offset, broadcast information, etc.). The PSBCH and SLSS may be transmitted in the same time resource unit, or the PSBCH may be transmitted in a time resource unit after that in which the SLSS is transmitted. A DMRS may be used to demodulate the PSBCH.

Sidelink Transmission Mode

For sidelink communication, transmission modes 1, 2, 3 and 4 are used.

In transmission mode 1/3, the BS performs resource scheduling for UE 1 over a PDCCH (more specifically, DCI) and UE 1 performs D2D/V2X communication with UE 2 according to the corresponding resource scheduling. After transmitting sidelink control information (SCI) to UE 2 over a physical sidelink control channel (PSCCH), UE 1 may transmit data based on the SCI over a physical sidelink shared channel (PSSCH). Transmission modes 1 and 3 may be applied to D2D and V2X, respectively.

Transmission mode 2/4 may be a mode in which the UE performs autonomous scheduling (self-scheduling). Specifically, transmission mode 2 is applied to D2D. The UE may perform D2D operation by autonomously selecting a resource from a configured resource pool. Transmission mode 4 is applied to V2X. The UE may perform V2X operation by autonomously selecting a resource from a selection window through a sensing process. After transmitting the SCI to UE 2 over the PSCCH, UE 1 may transmit data based on the SCI over the PSSCH. Hereinafter, the term 'transmission mode' may be simply referred to as 'mode'.

Control information transmitted by a BS to a UE over a PDCCH may be referred to as DCI, whereas control information transmitted by a UE to another UE over a PSCCH may be referred to as SCI. The SCI may carry sidelink scheduling information. The SCI may have several formats, for example, SCI format 0 and SCI format 1.

SCI format 0 may be used for scheduling the PSSCH. SCI format 0 may include a frequency hopping flag (1 bit), a resource block allocation and hopping resource allocation field (the number of bits may vary depending on the number of sidelink RBs), a time resource pattern (7 bits), a modulation and coding scheme (MCS) (5 bits), a time advance indication (11 bits), a group destination ID (8 bits), etc.

SCI format 1 may be used for scheduling the PSSCH. SCI format 1 may include a priority (3 bits), a resource reservation (4 bits), the location of frequency resources for initial transmission and retransmission (the number of bits may vary depending on the number of sidelink subchannels), a time gap between initial transmission and retransmission (4 bits), an MCS (5 bits), a retransmission index (1 bit), a reserved information bit, etc. Hereinbelow, the term 'reserved information bit' may be simply referred to as 'reserved bit'. The reserved bit may be added until the bit size of SCI format 1 becomes 32 bits.

SCI format 0 may be used for transmission modes 1 and 2, and SCI format 1 may be used for transmission modes 3 and 4.

Sidelink Resource Pool

Figure 5:
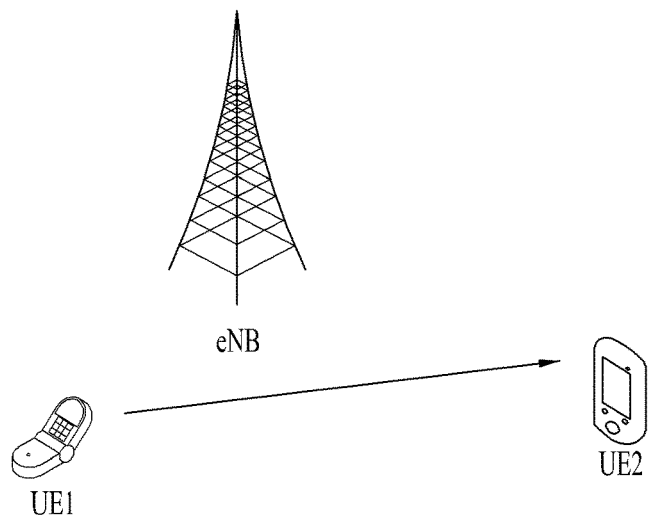
FIG. 5 illustrates a sidelink resource pool.
Figure 5:
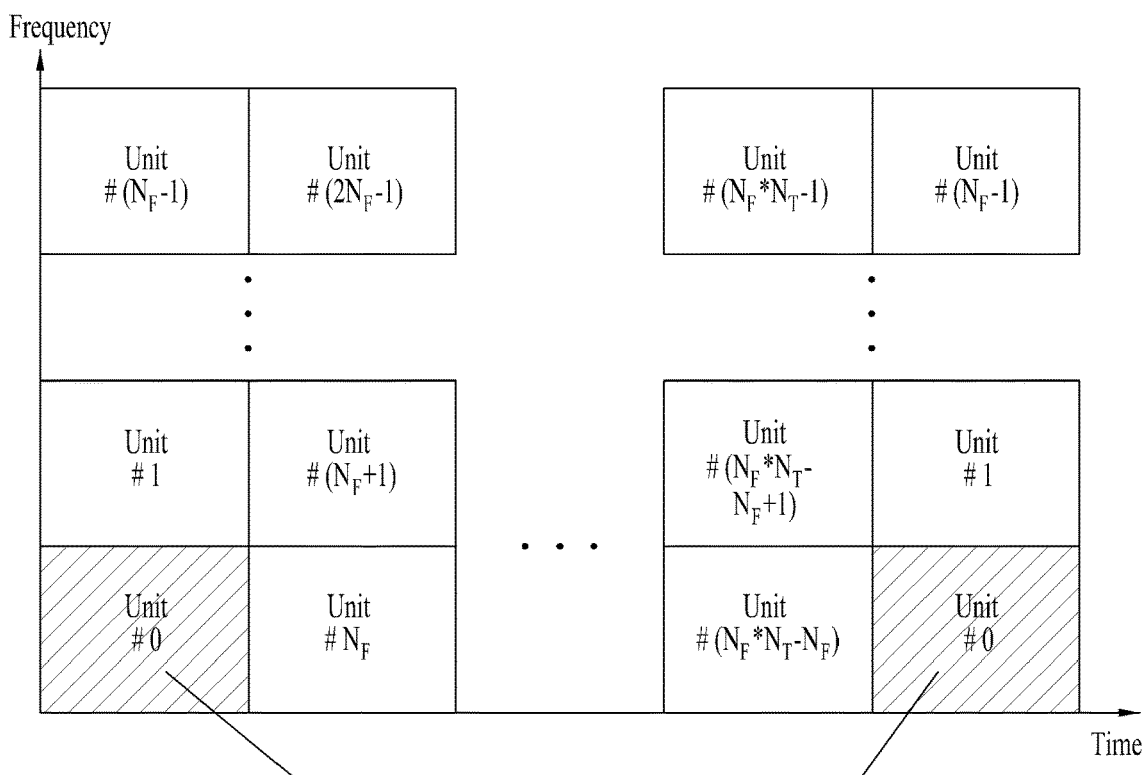

FIG. 5 shows an example of a first UE (UE1), a second UE (UE2) and a resource pool used by UE1 and UE2 performing sidelink communication.

Figure 8:
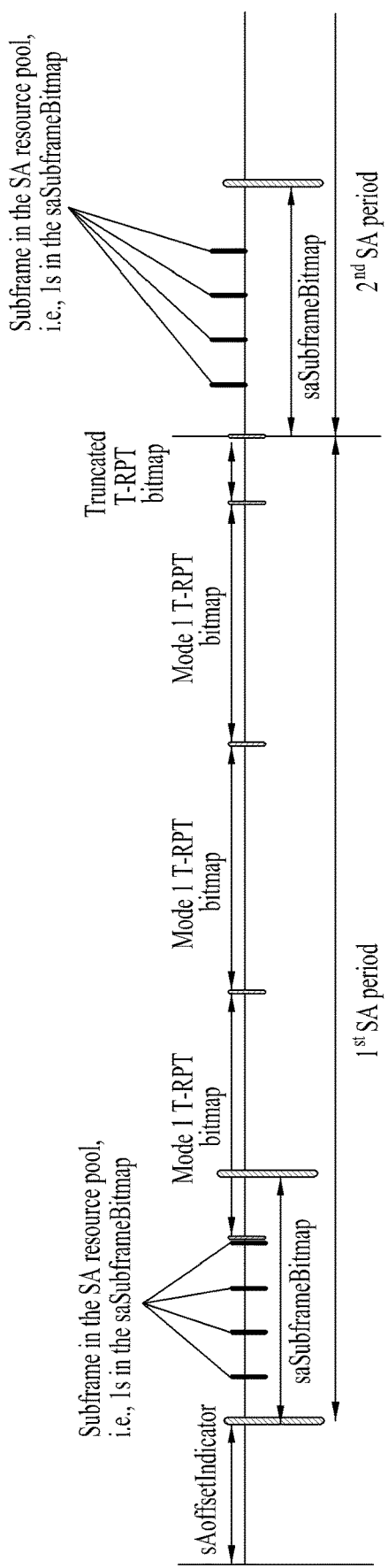
FIG. 8 illustrates transmission of a physical sidelink control channel (PSCCH).

In FIG. 5(a), a UE corresponds to a terminal or such a network device as a BS transmitting and receiving a signal according to a sidelink communication scheme. A UE selects a resource unit corresponding to a specific resource from a resource pool corresponding to a set of resources and the UE transmits a sidelink signal using the selected resource unit. UE2 corresponding to a receiving UE receives a configuration of a resource pool in which UE1 is able to transmit a signal and detects a signal of UE1 in the resource pool. In this case, if UE1 is located in the coverage of a BS, the BS may inform UE1 of the resource pool. If UE1 is located out of the coverage of the BS, the resource pool may be informed by a different UE or may be determined by a predetermined resource. In general, a resource pool includes a plurality of resource units. A UE selects one or more resource units from among a plurality of the resource units and may be able to use the selected resource unit(s) for sidelink signal transmission. FIG. 5(b) shows an example of configuring a resource unit. Referring to FIG. 8(b), the entire frequency resources are divided into the NF number of resource units and the entire time resources are divided into the NT number of resource units. In particular, it is able to define NF*NT number of resource units in total. In particular, a resource pool may be repeated with a period of NT subframes. Specifically, as shown in FIG. 8, one resource unit may periodically and repeatedly appear. Alternatively, an index of a physical resource unit to which a logical resource unit is mapped may change with a predetermined pattern according to time to obtain a diversity gain in time domain and/or frequency domain. In this resource unit structure, a resource pool may correspond to a set of resource units capable of being used by a UE intending to transmit a sidelink signal.

A resource pool may be classified into various types. First of all, the resource pool may be classified according to contents of a sidelink signal transmitted via each resource pool. For example, the contents of the sidelink signal may be classified into various signals and a separate resource pool may be configured according to each of the contents. The contents of the sidelink signal may include a scheduling assignment (SA or physical sidelink control channel (PSCCH)), a sidelink data channel, and a discovery channel. The SA may correspond to a signal including information on a resource position of a sidelink data channel, information on a modulation and coding scheme (MCS) necessary for modulating and demodulating a data channel, information on a MIMO transmission scheme, information on a timing advance (TA), and the like. The SA signal may be transmitted on an identical resource unit in a manner of being multiplexed with sidelink data. In this case, an SA resource pool may correspond to a pool of resources that an SA and sidelink data are transmitted in a manner of being multiplexed. The SA signal may also be referred to as a sidelink control channel or a physical sidelink control channel (PSCCH). The sidelink data channel (or, physical sidelink shared channel (PSSCH)) corresponds to a resource pool used by a transmitting UE to transmit user data. If an SA and a sidelink data are transmitted in a manner of being multiplexed in an identical resource unit, sidelink data channel except SA information may be transmitted only in a resource pool for the sidelink data channel. In other word, REs, which are used to transmit SA information in a specific resource unit of an SA resource pool, may also be used for transmitting sidelink data in a sidelink data channel resource pool. The discovery channel may correspond to a resource pool for a message that enables a neighboring UE to discover transmitting UE transmitting information such as ID of the UE, and the like.

Despite the same contents, sidelink signals may use different resource pools according to the transmission and reception properties of the sidelink signals. For example, despite the same sidelink data channels or the same discovery messages, they may be distinguished by different resource pools according to transmission timing determination schemes for the sidelink signals (e.g., whether a sidelink signal is transmitted at the reception time of a synchronization reference signal or at a time resulting from applying a predetermined TA to the reception time of the synchronization reference signal), resource allocation schemes for the sidelink signals (e.g., whether a BS configures the transmission resources of an individual signal for an individual transmitting UE or the individual transmitting UE autonomously selects the transmission resources of an individual signal in a pool), the signal formats of the sidelink signals (e.g., the number of symbols occupied by each sidelink signal in one subframe or the number of subframes used for transmission of a sidelink signal), signal strengths from the BS, the transmission power of a sidelink UE, and so on. In sidelink communication, a mode in which a BS directly indicates transmission resources to a sidelink transmitting UE is referred to as sidelink transmission mode 1, and a mode in which a transmission resource area is preconfigured or the BS configures a transmission resource area and the UE directly selects transmission resources is referred to as sidelink transmission mode 2. In sidelink discovery, a mode in which a BS directly indicates resources is referred to as Type 2, and a mode in which a UE selects transmission resources directly from a preconfigured resource area or a resource area indicated by the BS is referred to as Type 1.

In V2X, sidelink transmission mode 3 based on centralized scheduling and sidelink transmission mode 4 based on distributed scheduling are available.

Figure 6:
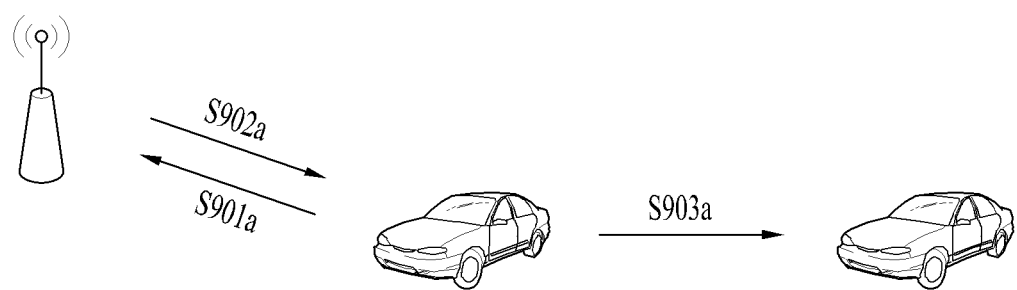
FIG. 6 illustrates scheduling schemes based on sidelink transmission modes.
Figure 6:
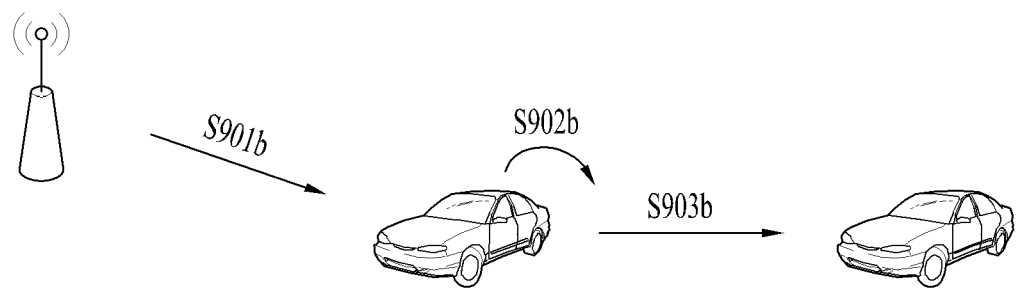

FIG. 6 illustrates scheduling schemes based on these two transmission modes. Referring to FIG. 6, in transmission mode 3 based on centralized scheduling of FIG. 6(*a*), a vehicle requests sidelink resources to a BS (S901*a*), and the BS allocates the resources (S902*a*). Then, the vehicle transmits a signal on the resources to another vehicle (S903*a*). In the centralized transmission, resources on another carrier may also be scheduled. In transmission mode 4 based on distributed scheduling of FIG. 6(*b*), a vehicle selects transmission resources (S902*b*) by sensing a resource pool, which is preconfigured by a BS (S901*b*). Then, the vehicle may transmit a signal on the selected resources to another vehicle (S903*b*).

Figure 7:
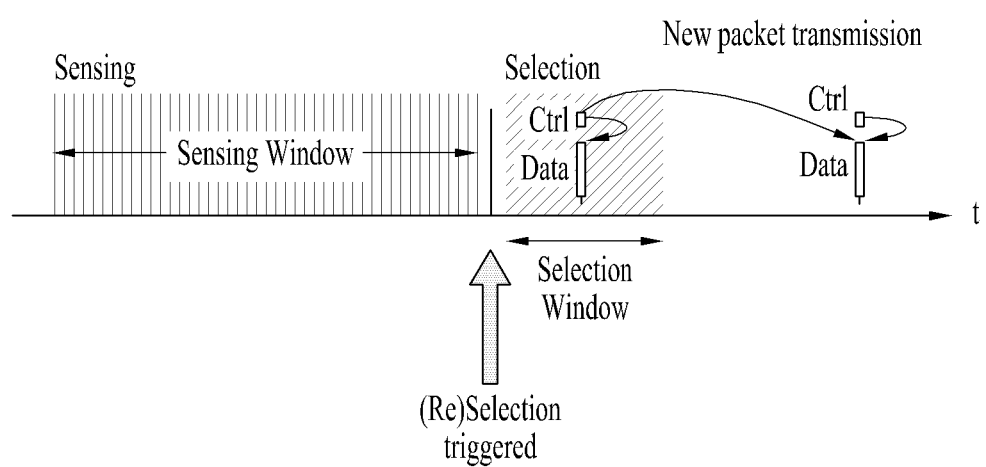
FIG. 7 illustrates selection of sidelink transmission resources.

When the transmission resources are selected, transmission resources for a next packet are also reserved as illustrated in FIG. 7. In V2X, transmission is performed twice for each MAC PDU. When resources for initial transmission are selected, resources for retransmission are also reserved with a predetermined time gap from the resources for the initial transmission. The UE may identify transmission resources reserved by other UEs or resources used by other UEs through sensing in a sensing window, exclude the transmission resources from a selection window, and randomly select resources with less interference from among the remaining resources.

For example, the UE may decode a PSCCH including information about the cycle of reserved resources within the sensing window and measure PSSCH RSRP on periodic resources determined based on the PSCCH. The UE may exclude resources with PSCCH RSRP more than a threshold from the selection window. Thereafter, the UE may randomly select sidelink resources from the remaining resources in the selection window.

Alternatively, the UE may measure received signal strength indication (RSSI) for the periodic resources in the sensing window and identify resources with less interference, for example, the bottom 20 percent. After selecting resources included in the selection window from among the periodic resources, the UE may randomly select sidelink resources from among the resources included in the selection window. For example, when PSCCH decoding fails, the above method may be applied.

The details thereof may be found in clause 14 of 3GPP TS 3GPP TS 36.213 V14.6.0, which are incorporated herein by reference.

Transmission and Reception of PSCCH

In sidelink transmission mode 1, a UE may transmit a PSCCH (sidelink control signal, SCI, etc.) on a resource configured by a BS. In sidelink transmission mode 2, the BS may configure resources used for sidelink transmission for the UE, and the UE may transmit the PSCCH by selecting a time-frequency resource from among the configured resources.

FIG. 8 shows a PSCCH period defined for sidelink transmission mode 1 or 2.

Referring to FIG. 8, a first PSCCH (or SA) period may start in a time resource unit apart by a predetermined offset from a specific system frame, where the predetermined offset is indicated by higher layer signaling. Each PSCCH period may include a PSCCH resource pool and a time resource unit pool for sidelink data transmission. The PSCCH resource pool may include the first time resource unit in the PSCCH period to the last time resource unit among time resource units indicated as carrying a PSCCH by a time resource unit bitmap. In mode 1, since a time-resource pattern for transmission (T-RPT) or a time-resource pattern (TRP) is applied, the resource pool for sidelink data transmission may include time resource units used for actual transmission. As shown in the drawing, when the number of time resource units included in the PSCCH period except for the PSCCH resource pool is more than the number of T-RPT bits, the T-RPT may be applied repeatedly, and the last applied T-RPT may be truncated as many as the number of remaining time resource units. A transmitting UE performs transmission at a T-RPT position of 1 in a T-RPT bitmap, and transmission is performed four times in one MAC PDU.

Figure 9:
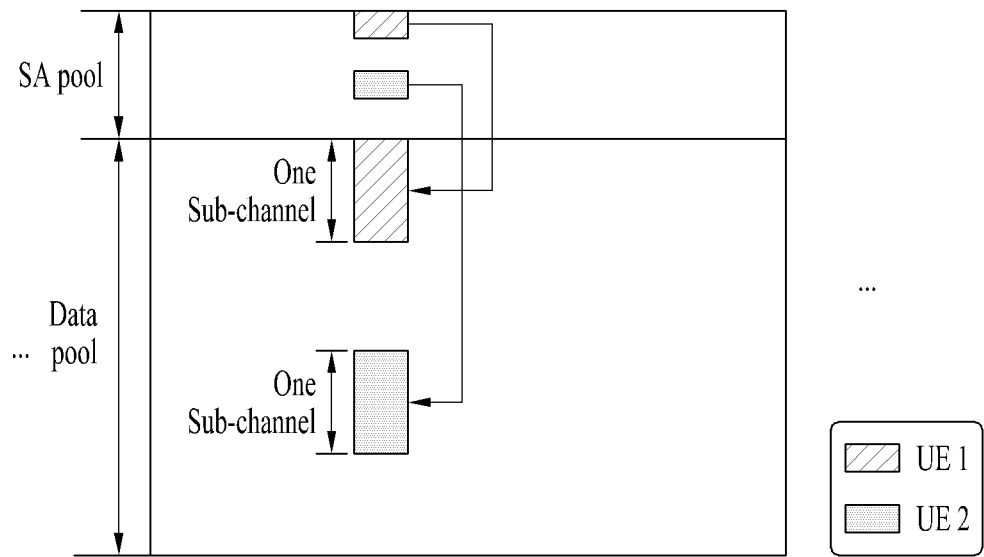
FIG. 9 illustrates PSCCH transmission in sidelink vehicle-to-everything (V2X) communication.
Figure 9:
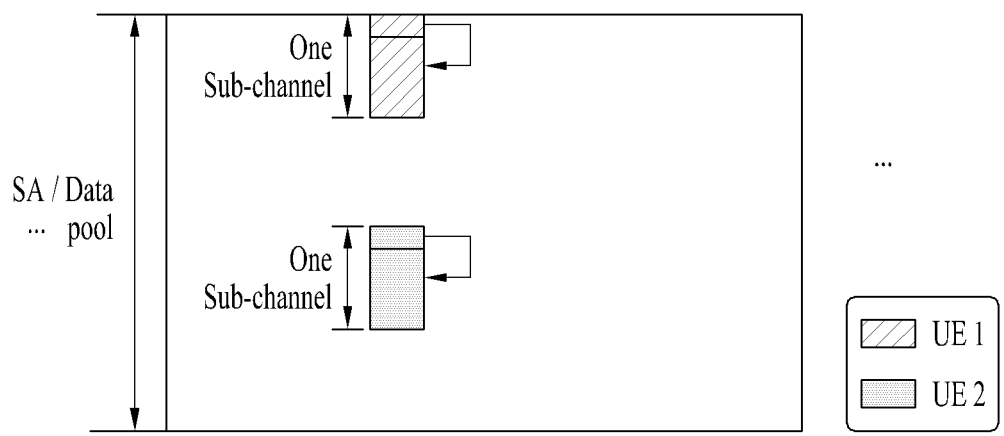

In V2X, that is, sidelink transmission mode 3 or 4, a PSCCH and data (PSSCH) are frequency division multiplexed (FDM) and transmitted, unlike sidelink communication. Since latency reduction is important in V2X in consideration of the nature of vehicle communication, the PSCCH and data are FDM and transmitted on the same time resources but different frequency resources. FIG. 9 illustrates examples of this transmission scheme. The PSCCH and data may not be contiguous to each other as illustrated in FIG. 9(*a*) or may be contiguous to each other as illustrated in FIG. 9(*b*). A subchannel is used as the basic unit for the transmission. The subchannel is a resource unit including one or more RBs in the frequency domain within a predetermined time resource (e.g., time resource unit). The number of RBs included in the subchannel, i.e., the size of the subchannel and the starting position of the subchannel in the frequency domain are indicated by higher layer signaling.

For V2V communication, a periodic type of cooperative awareness message (CAM) and an event-triggered type of decentralized environmental notification message (DENM) may be used. The CAM may include dynamic state information of a vehicle such as direction and speed, vehicle static data such as dimensions, and basic vehicle information such as ambient illumination states, path details, etc. The CAM may be 50 to 300 bytes long. In addition, the CAM is broadcast, and its latency should be less than 100 ms. The DENM may be generated upon occurrence of an unexpected incident such as a breakdown, an accident, etc. The DENM may be shorter than 3000 bytes, and it may be received by all vehicles within the transmission range. The DENM may have priority over the CAM. When it is said that messages are prioritized, it may mean that from the perspective of a UE, if there are a plurality of messages to be transmitted at the same time, a message with the highest priority is preferentially transmitted, or among the plurality of messages, the message with highest priority is transmitted earlier in time than other messages. From the perspective of multiple UEs, a high-priority message may be regarded to be less vulnerable to interference than a low-priority message, thereby reducing the probability of reception error. If security overhead is included in the CAM, the CAM may have a large message size compared to when there is no security overhead.

Sidelink Congestion Control

A sidelink radio communication environment may easily become congested according to increases in the density of vehicles, the amount of information transfer, etc. Various methods are applicable for congestion reduction. For example, distributed congestion control may be applied.

In the distributed congestion control, a UE understands the congestion level of a network and performs transmission control. In this case, the congestion control needs to be performed in consideration of the priorities of traffic (e.g., packets).

Specifically, each UE may measure a channel busy ratio (CBR) and then determine the maximum value (CRlimitk) of a channel occupancy ratio (CRk) that can be occupied by each traffic priority (e.g., k) according to the CBR. For example, the UE may calculate the maximum value (CRlimitk) of the channel occupancy ratio for each traffic priority based on CBR measurement values and a predetermined table. If traffic has a higher priority, the maximum value of the channel occupancy ratio may increase.

The UE may perform the congestion control as follows. The UE may limit the sum of the channel occupancy ratios of traffic with a priority k such that the sum does not exceed a predetermined value, where k is less than i. According to this method, the channel occupancy ratios of traffic with low priorities are further restricted.

Besides, the UE may use methods such as control of the magnitude of transmission power, packet drop, determination of retransmission or non-retransmission, and control of the size of a transmission RB (MCS adjustment).

5G Use Cases

Three key requirement areas of 5G (e.g., NR) include (1) enhanced mobile broadband (eMBB), (2) massive machine type communication (mMTC), and (3) ultra-reliable and low latency communications (URLLC).

Some use cases may require multiple dimensions for optimization, while others may focus only on one key performance indicator (KPI). 5G supports such diverse use cases in a flexible and reliable way.

eMBB goes far beyond basic mobile Internet access and covers rich interactive work, media and entertainment applications in the cloud or augmented reality (AR). Data is one of the key drivers for 5G and in the 5G era, we may for the first time see no dedicated voice service. In 5G, voice is expected to be handled as an application program, simply using data connectivity provided by a communication system. The main drivers for an increased traffic volume are the increase in the size of content and the number of applications requiring high data rates. Streaming services (audio and video), interactive video, and mobile Internet connectivity will continue to be used more broadly as more devices connect to the Internet. Many of these applications require always-on connectivity to push real time information and notifications to users. Cloud storage and applications are rapidly increasing for mobile communication platforms. This is applicable for both work and entertainment. Cloud storage is one particular use case driving the growth of uplink data rates. 5G will also be used for remote work in the cloud which, when done with tactile interfaces, requires much lower end-to-end latencies in order to maintain a good user experience. Entertainment, for example, cloud gaming and video streaming, is another key driver for the increasing need for mobile broadband capacity. Entertainment will be very essential on smart phones and tablets everywhere, including high mobility environments such as trains, cars and airplanes. Another use case is augmented reality (AR) for entertainment and information search, which requires very low latencies and significant instant data volumes.

One of the most expected 5G use cases is the functionality of actively connecting embedded sensors in every field, that is, mMTC. It is expected that there will be 20.4 billion potential Internet of things (IoT) devices by 2020. In industrial IoT, 5G is one of areas that play key roles in enabling smart city, asset tracking, smart utility, agriculture, and security infrastructure.

URLLC includes services which will transform industries with ultra-reliable/available, low latency links such as remote control of critical infrastructure and self-driving vehicles. The level of reliability and latency are vital to smart-grid control, industrial automation, robotics, drone control and coordination, and so on.

Now, multiple 5G use cases will be described in detail.

5G may complement fiber-to-the home (FTTH) and cable-based broadband (or data-over-cable service interface specifications (DOCSIS)) as a means of providing streams at data rates of hundreds of megabits per second to giga bits per second. Such a high speed is required for TV broadcasts at or above a resolution of 4K (6K, 8K, and higher) as well as virtual reality (VR) and AR. VR and AR applications mostly include immersive sport games. A special network configuration may be required for a specific application program. For VR games, for example, game companies may have to integrate a core server with an edge network server of a network operator in order to minimize latency.

The automotive sector is expected to be a very important new driver for 5G, with many use cases for mobile communications for vehicles. For example, entertainment for passengers requires simultaneous high capacity and high mobility mobile broadband, because future users will expect to continue their good quality connection independent of their location and speed. Other use cases for the automotive sector are AR dashboards. These display overlay information on top of what a driver is seeing through the front window, identifying objects in the dark and telling the driver about the distances and movements of the objects. In the future, wireless modules will enable communication between vehicles themselves, information exchange between vehicles and supporting infrastructure and between vehicles and other connected devices (e.g., those carried by pedestrians). Safety systems may guide drivers on alternative courses of action to allow them to drive more safely and lower the risks of accidents. The next stage will be remote-controlled or self-driving vehicles. These require very reliable, very fast communication between different self-driving vehicles and between vehicles and infrastructure. In the future, self-driving vehicles will execute all driving activities, while drivers are focusing on traffic abnormality elusive to the vehicles themselves. The technical requirements for self-driving vehicles call for ultra-low latencies and ultra-high reliability, increasing traffic safety to levels humans cannot achieve.

Smart cities and smart homes, often referred to as smart society, will be embedded with dense wireless sensor networks. Distributed networks of intelligent sensors will identify conditions for cost- and energy-efficient maintenance of the city or home. A similar setup can be done for each home, where temperature sensors, window and heating controllers, burglar alarms, and home appliances are all connected wirelessly. Many of these sensors are typically characterized by low data rate, low power, and low cost, but for example, real time high definition (HD) video may be required in some types of devices for surveillance.

The consumption and distribution of energy, including heat or gas, is becoming highly decentralized, creating the need for automated control of a very distributed sensor network. A smart grid interconnects such sensors, using digital information and communications technology to gather and act on information. This information may include information about the behaviors of suppliers and consumers, allowing the smart grid to improve the efficiency, reliability, economics and sustainability of the production and distribution of fuels such as electricity in an automated fashion. A smart grid may be seen as another sensor network with low delays.

The health sector has many applications that may benefit from mobile communications. Communications systems enable telemedicine, which provides clinical health care at a distance. It helps eliminate distance barriers and may improve access to medical services that would often not be consistently available in distant rural communities. It is also used to save lives in critical care and emergency situations. Wireless sensor networks based on mobile communication may provide remote monitoring and sensors for parameters such as heart rate and blood pressure.

Wireless and mobile communications are becoming increasingly important for industrial applications. Wires are expensive to install and maintain, and the possibility of replacing cables with reconfigurable wireless links is a tempting opportunity for many industries. However, achieving this requires that the wireless connection works with a similar delay, reliability and capacity as cables and that its management is simplified. Low delays and very low error probabilities are new requirements that need to be addressed with 5G.

Finally, logistics and freight tracking are important use cases for mobile communications that enable the tracking of inventory and packages wherever they are by using location-based information systems. The logistics and freight tracking use cases typically require lower data rates but need wide coverage and reliable location information.

CR and CBR

The following contents may be described with respect to CR and CBR.

When UEs transmit signals, if the number of surrounding UEs is excessively big (or an amount of measured interference is excessively large), each individual UE changes a transmission power, a size of a frequency resource in use, a size of a time resource in use, a packet transmission periodicity and the like, thereby reducing influence on the surrounding UEs. In doing so, the UEs may determine different transmission parameters depending on significances (or priorities) of transmitted packets. Thus, a UE's operation of recognizing a surrounding situation and changing a transmission parameter will be called a congestion control. Regarding such a congestion control, a UE to which several resource regions (e.g., a resource pool) are allocated may perform a separate congestion control in each pool.

For the congestion control, a UE may measure a Channel Busy Ration (CBR) for surrounding situation recognition. The CBR may be defined as a ratio of resources determined as used by another UE in comparison to total resources. Whether each resource is used may be determined by the number of subchannels having RSSI exceeding a predetermined threshold over the total number of subchannels in a predetermined time interval based on whether a reception power or RSSI measured on the corresponding resource exceeds the predetermined threshold.

A UE measures a CBR within a resource region and changes all or some of CR (channel ratio or resource utilization, i.e., a ratio of a resource used by each UE to total resources), MCS, RB size (subchannel size, where a subchannel means a size of a basic frequency resource of which resource allocation occurs on a D2D communication occurring band), retransmission number, transmission power, resource reservation interval and the like for the measured CBR each. In doing so, a range of CR usable according to a CBR measured by a UE, a range of MCS, an RB size, a range of a subchannel and the like may be signaled by a network through a physical or higher layer signal, and such parameters may be determined in advance for a UE out of a coverage.

The following description is made in the section 14.1.1.4B of TS 36.213 of 3GPP (UE procedure for determining subframes and resource blocks for transmitting PSSCH and reserving resources for sidelink transmission mode 4). If a UE has a sidelink grant configured in a subframe $t_n^{SL}$ as well as a corresponding PSCCH resource m, a RB and subframe of a corresponding PSSCH transmission are determined according to the section 14.1.1.4C. The number of subframes of a time and frequency resources of a single set for a transmission occasion of PSSCH is given by $C_{resel}$. Here, $C_{resel}$ is set as $C_{resel}$=10*SL_RESOURCE_RESELECTION_COUNTER (see 3GPP 36.321). Otherwise, $C_{resel}$ is set to 1. Once a subchannel set of a subframe $t_m^{SL}$ is determined as a time and frequency resource for PSSCH transmission corresponding to a configured sidelink grant, a set of the same subchannels of a subframe $t_{m+j \times P'_{rsvp\_TX}}^{SL}$ is determined for PSSCH transmission corresponding to the same sidelink grant as well. Here, j=1, 2, . . . , $C_{resel}$−1, $P'_{rsvp\_TX}$=$P_{step}$× $P_{rsvp\_TX}$/100 and ($t_0^{SL}$, $t_1^{SL}$, $t_2^{SL}$, . . . ) are determined by the section 14.1.5. here, $P_{rsvp\_TX}$ is a resource reservation interval indicated through higher layer signaling. If a UE is configured with a higher layer parameter cr-Limit and transmits PSSCH in a subframe n, the UE should guarantee the following limit(s) for a random priority value k. (See Equation 1 below)

$$\sum_{i \geq K} CR(i) \leq CR_{Limit}(k) \qquad \text{[Equation 1]}$$

Here, CR(i) is a CR evaluated in a subframe (n−4) for PSSCH transmission having a 'priority' field of SCI set to i, and $CR_{Limit}(k)$ is associated with a CBR range including a priority value k and a CBR measured in a subframe (n−4). A method of satisfying the above limit, which includes dropping a transmission in a subframe n, depends on implementation of a UE.

TABLE 2

| Definition | Channel busy ratio (CBR) measured in subframe n is defined as follows: For PSSCH, the portion of sub-channels in the resource pool whose S-RSSI measured by the UE exceed a (pre-)configured threshold sensed over subframes [n − 100, n − 1]; For PSCCH, in a pool (pre)configured such that PSCCH may be transmitted with its corresponding PSSCH in non-adjacent resource blocks, the portion of the resources of the PSCCH pool whose S-RSSI measured by the UE exceed a (pre-)configured threshold sensed over subframes [n − 100, n − 1], assuming that the PSCCH pool is composed of resources with a size of two consecutive PRB pairs in the frequency domain. |
|---|---|
| Applicable for | RRC_IDLE inta-frequency, RRC_IDLE inter-frequency, RRC_CONNECTED intra-frequency, RRC_CONNECTED inter-frequency |

Regarding CR, the section 5.1.31 of TS 36.214 of 3GPP defines Table 3 as follows.

TABLE 3

| Definition | Channel occupancy ratio (CR) evaluated at subframe n is defined as the total number of sub-channels used for its |
|---|---|

TABLE 3-continued

| | |
|---|---|
| | transmissions in subframes [n − a, n − 1] and granted in subframes [n, n + b] divided by the total number of configured sub-channels in the transmission pool over [n − a, n + b]. |
| Applicable for | RRC_IDLE intra-frequency, RRC_IDLE inter-frequency, RRC_CONNECTED intra-frequency, RRC_CONNECTED inter-frequency |

Here, a is a positive integer, b is 0 or a positive integer, a and b are determined by UE implementation of 'a+b+1=1000' and 'a≥500', and (n+b) should not exceed a last transmission occasion of a grant for a current transmission. CR is evaluated for each (re)transmission. In evaluation a CR, a UE should assume that a transmission parameter used in a subframe n is reused according to an existing grant(s) of a subframe [n+1, n+b] without a packet drop. A subframe index is based on a physical subframe index. A CR may be calculated per priority level.

EMBODIMENT

The present disclosure proposes a method of effectively controlling a congestion situation in UE-to-UE direct communication (D2D communication).

Described in the present disclosure are how to effectively measure a Channel Busy Ratio (CBR) in a situation that a transmission power used by each UE is different in D2D communication or that message types, messages sizes, message kinds and the like are different therein and how to adjust a transmission parameter with reference to a value measured in a prescribed manner. In the legacy 3GPP Rel. 14 LTE V2X, a Channel Busy Ratio (CBR) is measured in a predetermined time interval and a Channel Occupancy Ratio (CR) is adjusted with reference to the measured CBR. Here, the CBR means a ratio that a measured value, which is generated from measuring a Received Signal Strength Indicator (RSSI) per subchannel for a predetermined time, exceeds a predetermined threshold. The CR indicates a ratio of a resource used by an individual UE for a predetermined time. Used in the legacy LTE V2X is a method of measuring a CBR by a UE and adjusting a size of a transmission resource to satisfy a CR limit corresponding to the measured CBR. Since LTE V2X assumes that most of UEs send basic safety messages, it may be able to assume that transmission powers or message sizes of UEs will be similar, whereby a method of simply measuring a use amount of a resource and adjusting it to become equal to or lower than a predetermined level is used.

However, in 3GPP Rel. 16 NR V2X, a UE supports various V2X services and a transmission power used per UE or a size of a resource used per UE may be different markedly. Although a resource size may be similar between UEs, it may happen that a transmission power is different markedly between UEs. Even if a transmission power is different markedly, as an amount of a used resource is equal, if it is evaluated as the same CR, an unfair congestion control may occur. If a lot of power is used, it may be regarded as causing more interference to another UE. In this case, it may be regarded as causing more congestion.

The present disclosure proposes a method of effectively performing a congestion control when UEs use different transmission powers and different transmission resource sizes.

A Channel Occupancy Ratio (CR) may be defined as the total number of subchannels used for its transmission. Hence, an amount of a resource in use is considered as an evaluation factor of the CR. Yet, in case that a CR of a UE that uses a large transmission power and a CR of a UE that uses a small transmission power are evaluated as same, the UE that uses the small transmission power has restriction on a resource use despite generating relatively less interference. So to speak, unfairness that results in an evaluation result different from an actual situation may arise.

Proposed in the present disclosure is a method of resolving such unfairness. Although the description is made in the following disclosure based on the definition of 3GPP TS36.214, if this definition is changed in NR, the present disclosure may be applicable according to the changed definition.

When measuring a Channel Occupancy Ratio (CR), a UE (e.g., a Tx UE) performs CR measurement in consideration of an amount of a resource that uses a transmission power over a predetermined threshold. In doing so, a threshold of a transmission power used in measuring CR may be predetermined or transmitted to a UE by a network (e.g., a BS such as an eNB, a gNB, etc.) through physical or higher layer signaling.

Figure 10:
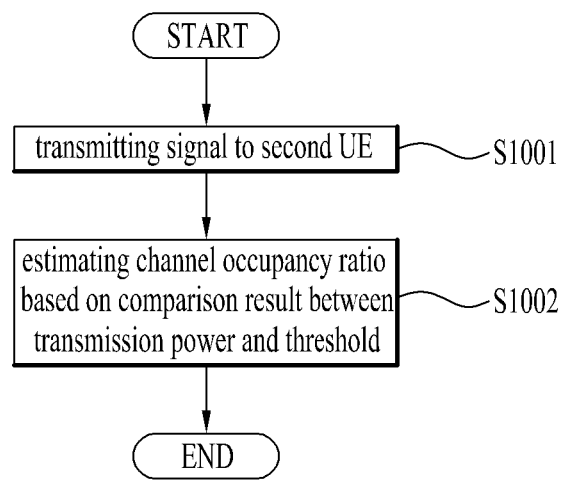
FIG. 10 is a flowchart showing one embodiment of the present disclosure.

FIG. 10 is a flowchart showing one embodiment of the present disclosure.

Referring to FIG. 10, a method of measuring a Channel Occupancy Ratio (CR) by a first UE (e.g., Tx UE) in a wireless communication system according to one embodiment of the present disclosure includes a step S1001 of transmitting a signal to a second UE (e.g., Rx UE) by the first UE and a step S1002 of measuring the channel occupancy ratio by the first UE based on the transmitted signal. Regarding the step S1002, the channel occupancy ratio may be measured using a scaling value and/or a bias value configured based on a result from comparing a transmission power for the transmission of the signal with a threshold. Here, the channel occupancy ratio may mean a Channel Occupancy Ratio (CR). When a UE measures a CR, if the transmission power is lower than the threshold, the UE may use a scaling value (e.g., 0<a<1) greater than 0 and smaller than 1. If the transmission power is equal to or greater than the threshold, the UE may use a scaling value (e.g., a=1) that is a value of 0.

Thus, a UE (e.g., Tx UE) may use a different CR measurement process (or a different CR measurement algorithm) according to a result from comparing a transmission power and a threshold with each other. Namely, in case that a Tx UE transmits a signal using a transmission power lower than a threshold, a fact that interference influence caused to another UE (e.g., an adjacent UE) is relatively small is taken into consideration.

For one example, in case of using a transmission power equal to or more than a threshold, a UE may perform a CR measurement in consideration of a ratio of a resource used by each UE to total resources without applying a scaling and/or bias.

For another example, in case of using a transmission power less than a threshold, a UE may measure a CR using an equation that includes a value resulting from scaling an amount of a used resource by a (0<a<1) and/or a value resulting from applying a bias amounting to b to the amount of the resource. For instance, assuming that an amount of a resource used by a UE within a resource region for measuring a CR is X, if a transmission power is smaller than a threshold, the UE may perform a CR measurement using a value of (a*b) and/or a value of (X−b).

In addition, a UE may perform a CR measurement using an equation configured in a function form of Y=f(X). Here, X may indicate an amount of a resource used by the UE, Y may indicate an amount of a resource reflected in an actual CR measurement, and a function f may include a function predetermined according to a power range or a function configured by a network (e.g., a BS such as an eNB, a gNB, etc.). In this case, different scaling values, different bias values or different functions f may be configured according to a plurality of power ranges. In addition, a scaling value (e.g., a), a bias value (e.g., b) or a function f per power range may be predetermined or signaled by a network (e.g., a BS such as an eNB, a gNB, etc.) through a physical or higher layer signal. For instance, a power range is divided into N steps, scaling values per power range are predetermined as $a_1$ to $a_N$, and a UE may perform a CR measurement using a value resulting from multiplying a time resource amount and/or a frequency resource amount used by the UE by a scaling value per transmission power range.

In some implementations, at least one of a scaling value and a bias value may be determined based on a type or priority of a service related to the transmitted signal. For example, a scaling value and a bias value may be configured different according to CAST TYPE (e.g., UNICAST, GROUPCAST, BROADCAST), CONGESTION LEVEL (e.g., CBR), message type (e.g., periodic/aperiodic message, etc.) and the like.

Figure 11:
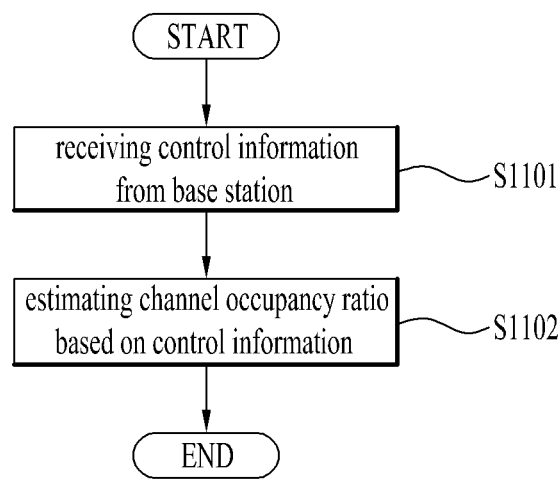
FIG. 11 is a flowchart showing one embodiment of the present disclosure.

Referring to FIG. 11, one embodiment of the present disclosure may further include a step of receiving by a UE (e.g., TX UE) control information indicating scaling values respectively mapped for a plurality of transmission power ranges from a BS and a step of measuring the channel occupancy ratio using a scaling value selected based on the scaling values respectively mapped for a plurality of the transmission power ranges indicated by the received control information. For example, a BS may transmit control information, which indicates that a scaling value $a_1$ is mapped for transmission powers $P_1$ and $P_2$ and that a scaling value $a_2$ is mapped for transmission powers $P_3$ and $P_4$, to a UE (e.g., Tx UE), and the UE may perform a CR measurement using a scaling value determined based on the received control information.

Meanwhile, when measuring a CR, a UE may calculate an average transmission power used in a time interval for measuring the CR and perform a CR measurement using the calculated average transmission power. For example, one embodiment of the present disclosure may further include a step of measuring an average transmission power during a time interval for measuring a Channel Occupancy Ratio (CR) and measuring the CR by a UE based on the measured average transmission power. For one example, if the calculated average transmission power is equal to or more than a threshold, the UE may perform a CR measurement using a CR measuring process that does not apply a scaling and/or bias. For another example, if the calculated average transmission power is less than the threshold, the UE may measure a CR using an equation that includes a value resulting from scaling the calculated average transmission power by a (0<a<1) and/or a value resulting from applying a bias to an amount of the resource by b.

In addition, a UE may measure a CR in consideration of a coverage of the UE. Here, the coverage may be calculated based on a size of a transmission power used in transmitting a signal by the UE.

For one example, in case that a UE transmits a packet to a UE of M % in a coverage having a size R, it may perform a CR measurement using a value of M*R. For another example, in case that a specific resource is transmitted using a transmission power named P, a UE calculates (predicts) a coverage R based on the P and measures a CR based on an equation including the coverage R and a value indicating an amount of a resource used for the signal transmission. For instance, a UE may measure a CR based on an equation including $\pi*d^2*X$. Here, $\pi$ indicates pi (about 3.141592), d may indicate a distance for a signal of the UE to arrive or a random distance determined with reference to the UE, and X may indicate an amount of a resource used for signal transmission. For another example, a size of a coverage is calculated based on an equation indicating an area of a circle centering on the Tx UE, and a UE may measure a CR based on the calculated size of the coverage. For another example, a Tx UE may measure a CR with reference to an average coverage achieved during a predetermined time interval. To this end, when receiving a packet transmitted by a Tx UE, an Rx UE may transmit information, which indicates a distance between the Rx UE and the Tx UE and whether to succeed in reception of the packet transmitted by the Tx UE, to the Tx UE through physical layer signaling and/or higher layer signaling. Alternatively, a Tx UE may convert its expected coverage based on its transmission power, Modulation and Coding Scheme (MCS), payload size and the like and then perform a CR measurement based on the conversion. For example, a function having inputs of MCS, transmission power and payload size is defined, and a CR measurement may be performed based on this function.

Meanwhile, UE's Channel State Information (CSI) or HARQ feedback operation may be supported in NR V2X, and such a feedback operation does not mean that a specific UE simply occupies a channel but is a resource used by another UE to enable a packet of another specific UE to be transceived well. Since this feedback resource may be regarded as a resource used for a Tx UE that transmits a packet, although the Tx UE does not transmit a signal on the corresponding resource directly, the feedback resource needs to be determined as a resource used by the Tx UE. Hence, when performing a CR measurement, a Tx UE can perform a CR measurement in consideration of a feedback resource for a feedback signal received in response to packet/data transmitted by the Tx UE. For example, in a step S1002 of FIG. 10, a Tx UE may obtain a Channel Occupancy Ratio (CR) in further consideration of a resource for reception of a feedback signal (from an Rx UE) for a transmitted signal.

In some implementations, the above-described embodiments of the present disclosure may be re-described as follows.

Method 1) A UE includes an amount of a used resource in a CR measurement only if using a transmission power equal to or more than a predetermined threshold in measuring a CR. In this case, a threshold of a transmission power used in measuring a CR may be predetermined or signaled to a UE by a network through a physical or higher layer signal.

Method 2) In case of using a transmission power less than a predetermined threshold in measuring a CR, a UE includes a value resulting from scaling an amount of a used resource by 'a' (a<1) time or a value resulting from biasing the amount with 'b'. For example, when a resource 'X' is used in a resource region for measuring a CR, if a transmission power is less than a predetermined threshold, a value of 'aX' or 'x−b' is reflected in a CR measurement. This is further extended generally to a function form of 'Y=f(X)'. Here, X is an amount of a resource used by a UE, Y is an amount of a resource reflected in an actual CR measurement, and a function 'f' is a function predetermined according to a power range or configured by a network. Here, different scaling or bias values or different functions 'f' may be configured according to a plurality of power ranges, and a scaling value per power range, a bias value per power range or a function 'f' per power range may be predetermined or signaled by a network through a physical or higher layer signal. For example, a power range is divided into N steps, per-power range scaling values are predetermined as a1 . . . aN, and a UE uses a scaling value per transmission power range in evaluating a CR in a manner that a time and frequency resource amount used by the UE is multiplied by the scaling value.

Method 3) when measuring a CR, a UE performs a congestion control in a manner of measuring an average power used in an interval for measuring the CR and then using the measured average power complexly. Regarding a CR, an average transmission power, which is used while a resource is used, is measured while an amount of a used resource is measured in an existing manner. If a transmission power is less than a predetermined threshold, a predetermined scaling or bias value or a specific function f is applied to a final CR measurement value. Based on this, a congestion control is performed.

Method 4) Proposed is a method of evaluating a CR differently according to an average spatially achieved by a UE instead of evaluating a CR simply with a power use amount and an amount of a used radio resource. For one example, in case that a UE achieves a coverage 'It' for X % of UEs by transmitting a specific packet, XR may be used for CR evaluation of the corresponding UE. For another example, if an amount of a specific resource is transmitted with a transmission power 'P', an expected coverage according to P is converted, and a CR is measured using a combination of the R and the used resource amount. For instance, pi*R^2*(amount of used resource) may be used for CR evaluation. A Tx UE may measure a CR with reference to an average coverage achieved during a predetermined time interval. To this end, an Rx UE may signal information, which indicates a distance to the Tx UE and a presence or non-presence of packet reception success when the Rx UE receives the corresponding packet, to the Tx UE through a physical or higher layer signal. Alternatively, a Tx UE may convert an expected coverage of its own based on transmission power, MCS, payload size and the like of the Tx UE and then perform a CR measurement based on the conversion. For example, a function having inputs of MCS, transmission power and payload size is defined, and a CR measurement may be then performed based on the defined function.

Method 5) Meanwhile, a UE's CSI or HARQ feedback operation may be supported in NR V2X. Such a feedback operation does not mean that a specific UE simply occupies a channel but is a resource used by another UE to enable a packet of another specific UE to be transceived well. Since this feedback resource is a resource used for a UE that transmits a packet originally, although a Tx UE does not transmit a signal on the corresponding resource directly, it is preferably evaluated as a resource used by a UE having transmitted data. Hence, proposed is a method that a Tx UE uses a feedback resource associated with data transmitted by the Tx UE in evaluating its CR for evaluation and measurement of its CR.

Moreover, in the present disclosure, a CR is not the number of subchannels simply used in a predetermined time interval but may use: i) a value resulting from dividing the total number of used Res by a size of a unit resource (e.g., a value predetermined or signaled by a network); or ii) a value resulting from averaging the total number of Res used for signal transmission for each transmission.

A disclosed matter and/or an embodiment in the present disclosure may be considered as a proposed method, but a combination of disclosed matters and/or embodiments may be also considered as a new method. Of course, in addition, a disclosed matter is non-limited to a specific system as well as to an embodiment proposed in the present disclosure. All parameters and/or operations in the present disclosure and/or combinations of each parameter and/or operation and/or applicability of the corresponding parameter and/or operation and/or applicability of combination between each parameter and/or operation may be (pre)configured for a UE by a BS through higher layer signaling and/or physical layer signaling or predefined in a system. In addition, each matter in the present disclosure is defined as a single operation mode, which is (pre)configured for a UE by a BS through higher layer signaling and/or physical layer signaling so as to enable the BS to operate according to the corresponding operation mode. A Transmit Time Interval (TTI) or a resource unit for signal transmission in the present disclosure may correspond to one of various length units such as sub-slot/slot/subframe, a basic unit, which is a transmission basic unit, and the like, and a UE in the present disclosure may correspond to one of various types of devices such as a vehicle, a pedestrian UE, etc. Matters related to operations of a UE and/or a BS and/or a Road Side Unit (RSU) are non-limited by the respective device types but are applicable to devices or different types. For example, the matter described as an operation of a BS in the present disclosure is applicable to an operation of a UE. Alternatively, the contents applied to D2D communication in the present disclosure is usable between a UE and a BS (e.g., uplink or downlink). In this case, the above-proposed method is usable for communication between a terminal and a BS, a relay node or a UE of a special type such as a UE type RSU or communication between wireless devices of special types. In addition, a BS in the above description may be substituted with a relay node or a UE-type RSU.

Example of Communication System to which the Present Invention is Applied

The various descriptions, functions, procedures, proposals, methods, and/or operational flowcharts of the present invention described in this document may be applied to, without being limited to, a variety of fields requiring wireless communication/connection (e.g., 5G) between devices.

Figure 12:
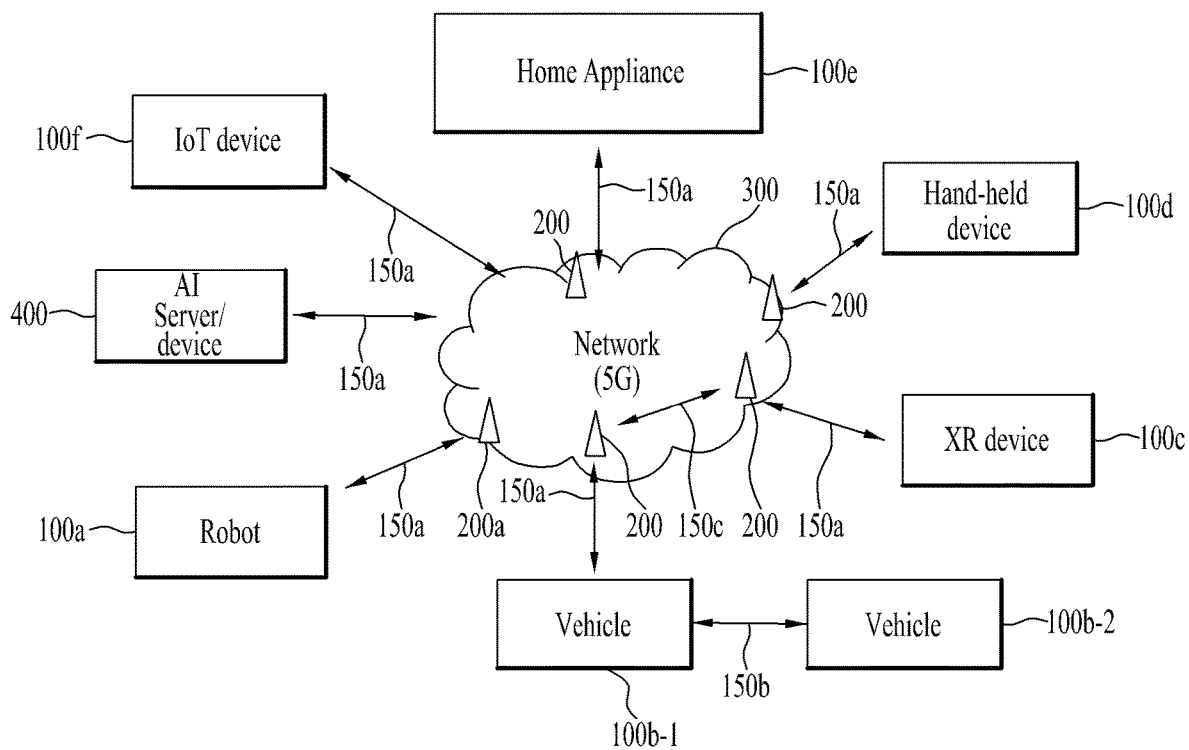
FIG. 12 illustrates a communication system applied to the present invention.

Hereinafter, a description will be given in more detail with reference to the drawings. In the following drawings/description, the same reference symbols may denote the same or corresponding hardware blocks, software blocks, or functional blocks unless described otherwise FIG. 12 illustrates a communication system applied to the present invention. Referring to FIG. 12, a communication system applied to the present invention includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The handheld device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present invention.

Example of Wireless Devices to which the Present Invention is Applied

Figure 13:
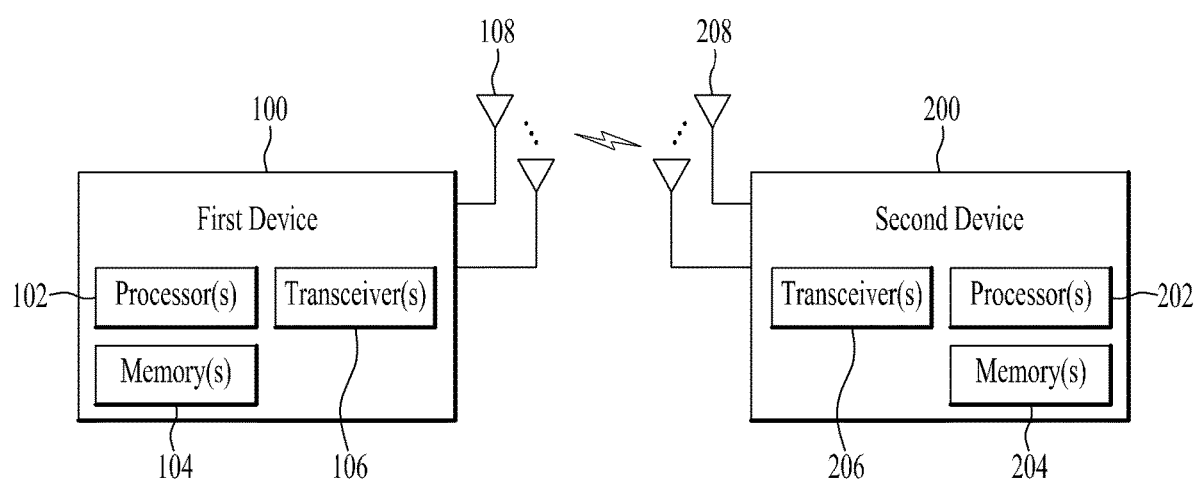
FIG. 13 illustrates wireless devices applicable to the present invention.

FIG. 13 illustrates wireless devices applicable to the present invention.

Referring to FIG. 13, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 12.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor 102 may be configured to implement at least one operation for the methods described with reference to FIG. 10 and FIG. 11. For example, the processor 102 may be configured to control the transceiver 106 to receive a first CB Group (CBG) including at least one first Code Block (CB), control the transceiver 106 to transmit a feedback signal, which indicates whether to fail in reception of a single CB or reception of a plurality of CBs, to the second wireless device 200, and control the transceiver 106 to receive a second CBG from the second wireless device 200. In addition, if information indicating the failure in the reception of the single CB is transmitted to the second wireless device 200, the second CBG may be configured to include at least one second CB XOR-operated for each of the at least one or more first CBs included in the first CBG.

For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present invention, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present invention, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Example of a Signal Process Circuit to which the Present Invention is Applied

Figure 14:
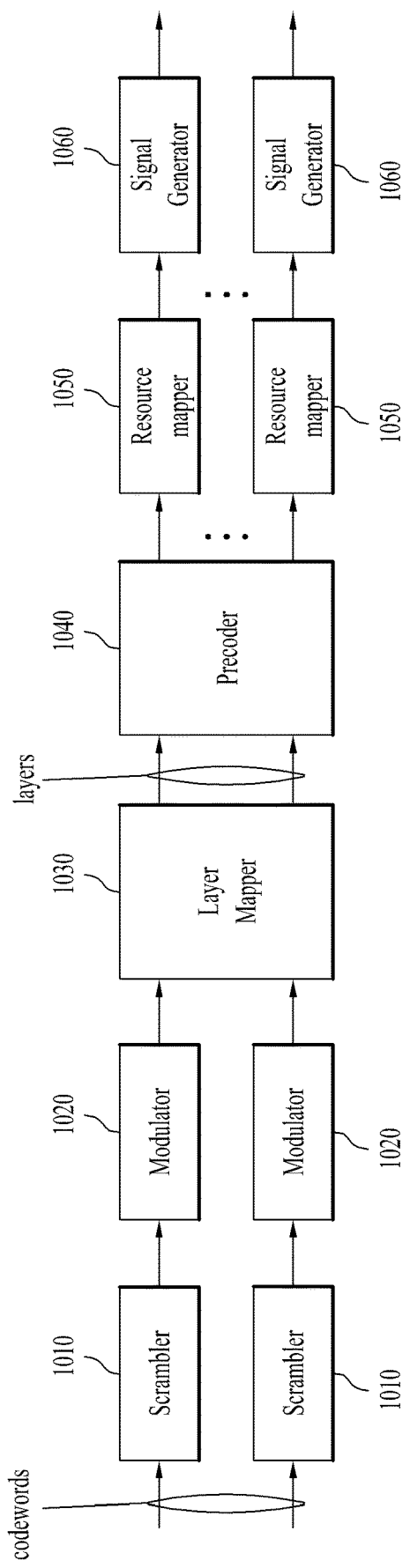
FIG. 14 illustrates a signal process circuit for a transmission signal.

FIG. 14 illustrates a signal process circuit for a transmission signal.

Referring to FIG. 14, a signal processing circuit 1000 may include scramblers 1010, modulators 1020, a layer mapper 1030, a precoder 1040, resource mappers 1050, and signal generators 1060. An operation/function of FIG. 14 may be performed, without being limited to, the processors 102 and 202 and/or the transceivers 106 and 206 of FIG. 13. Hardware elements of FIG. 14 may be implemented by the processors 102 and 202 and/or the transceivers 106 and 206 of FIG. 13. For example, blocks 1010 to 1060 may be implemented by the processors 102 and 202 of FIG. 13. Alternatively, the blocks 1010 to 1050 may be implemented by the processors 102 and 202 of FIG. 13 and the block 1060 may be implemented by the transceivers 106 and 206 of FIG. 13.

Codewords may be converted into radio signals via the signal processing circuit 1000 of FIG. 14. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 14. For example, the wireless devices (e.g., 100 and 200 of FIG. 13) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 15:
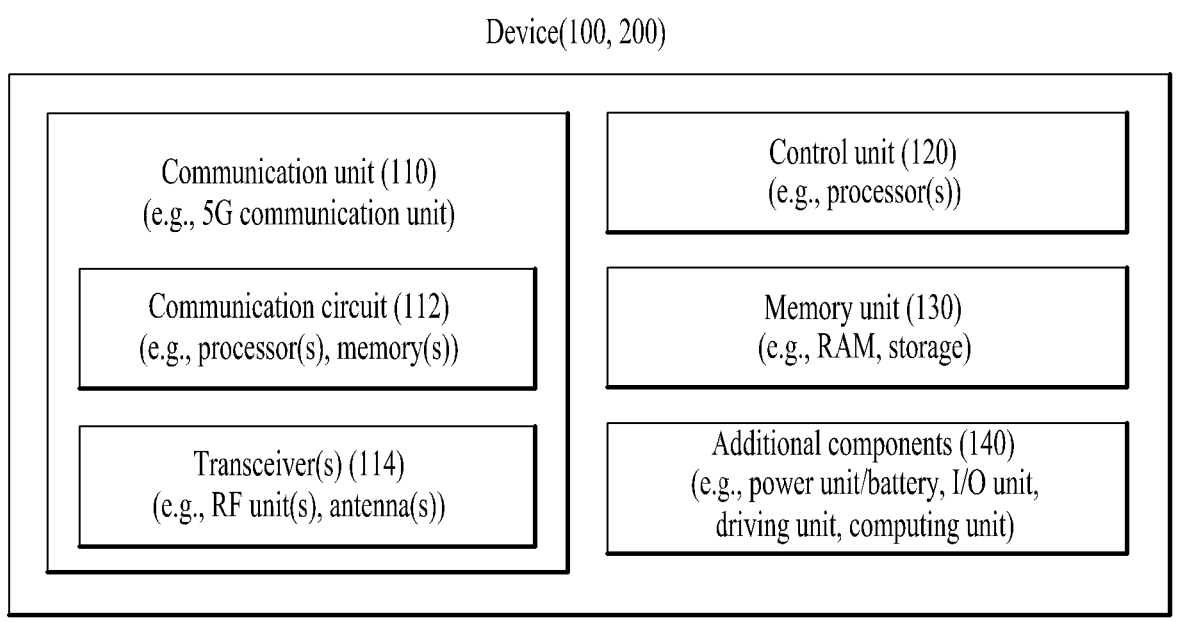
FIG. 15 illustrates another example of a wireless device applied to the present invention.

Application Example of a Wireless Device to which the Present Invention is Applied FIG. 15 illustrates another example of a wireless device applied to the present invention. The wireless device may be implemented in various forms according to a use-case/service (refer to FIG. 12 and FIGS. 16 to 18).

Referring to FIG. 15, wireless devices 100 and 200 may correspond to the wireless devices 100 and 200 of FIG. 13 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 13. For example, the transceiver(s) 114 may include the one or more transceivers 106 and 206 and/or the one or more antennas 108 and 208 of FIG. 13. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110. For example, the control unit 120 may be configured to implement at least one operation for the methods described with reference to FIG. 10 and FIG. 11. For example, the control unit 120 may be configured to control the communication unit 110 to receive a first CB Group (CBG) including at least one first Code Block (CB), control the communication unit 110 to transmit a feedback signal, which indicates whether to fail in reception of a single CB or reception of a plurality of CBs, to the second wireless device 200, and control the communication unit 110 to receive a second CBG from the second wireless device 200. In addition, if information indicating the failure in the reception of the single CB is transmitted to the second wireless device 200, the second CBG may be configured to include at least one second CB XOR-operated for each of the at least one or more first CBs included in the first CBG.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 12), the vehicles (100b-1 and 100b-2 of FIG. 12), the XR device (100c of FIG. W1), the hand-held device (100d of FIG. 12), the home appliance (100e of FIG. 12), the IoT device (100f of FIG. W1), a digital broadcast terminal, a hologram device, a public safety device, an MTC device, a medicine device, a fintech device (or a finance device), a security device, a climate/environment device, the AI server/device (400 of FIG. 12), the BSs (200 of FIG. 12), a network node, etc. The wireless device may be used in a mobile or fixed place according to a use-example/service.

In FIG. 15, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 15 will be described in detail with reference to the drawings.

Example of Hand-Held Device to which the Present Invention is Applied

Figure 16:
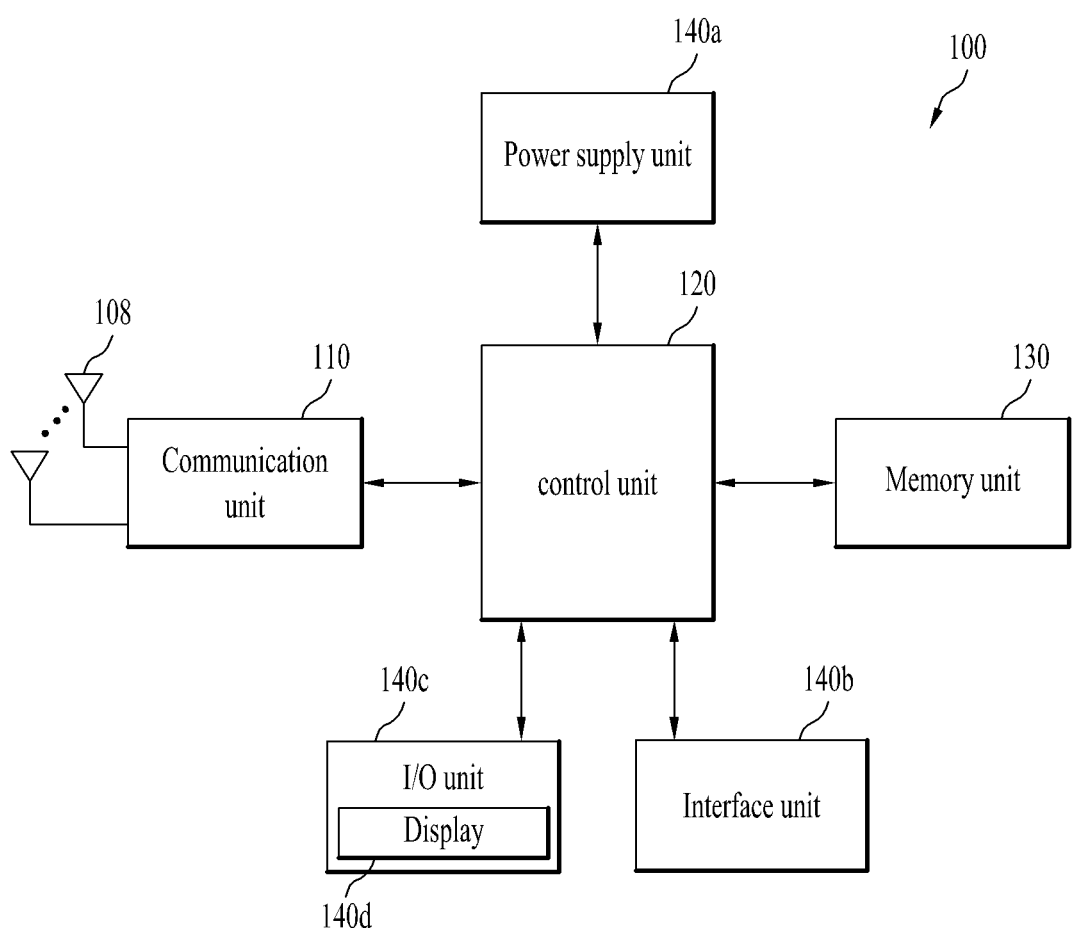
FIG. 16 illustrates a hand-held device applied to the present invention.

FIG. 16 illustrates a hand-held device applied to the present invention. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 16, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 15, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 17:
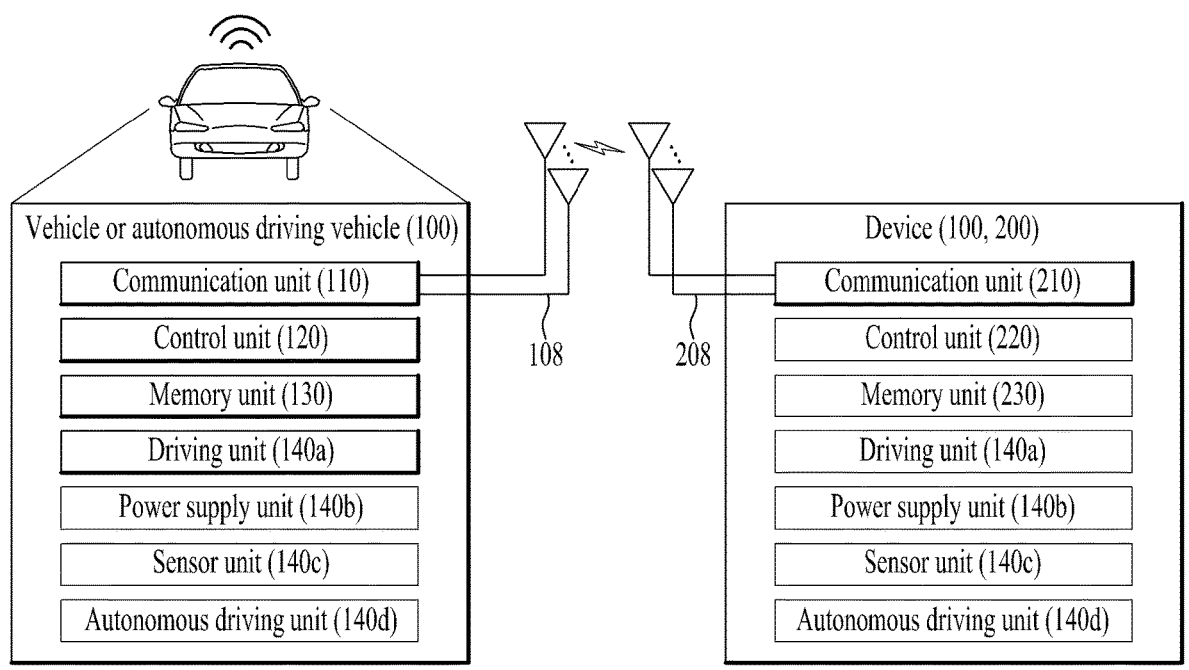
FIG. 17 illustrates a vehicle or an autonomous driving vehicle applied to the present invention.

Example of a Vehicle or an Autonomous Driving Vehicle to which the Present Invention is Applied FIG. 17 illustrates a vehicle or an autonomous driving vehicle applied to the present invention. The vehicle or autonomous driving vehicle may be implemented by a mobile robot, a car, a train, a manned/unmanned Aerial Vehicle (AV), a ship, etc.

Referring to FIG. 17, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 19, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). For example, the control unit 120 may be configured to implement at least one operation for the methods described with reference to FIG. 10 and FIG. 11. For example, the control unit 120 may be configured to control the communication unit 110 to receive a first CB Group (CBG) including at least one first Code Block (CB), control the communication unit 110 to transmit a feedback signal, which indicates whether to fail in reception of a single CB or reception of a plurality of CBs, to the second wireless device 200, and control the communication unit 110 to receive a second CBG from the second wireless device 200. In addition, if information indicating the failure in the reception of the single CB is transmitted to the second wireless device 200, the second CBG may be configured to include at least one second CB XOR-operated for each of the at least one or more first CBs included in the first CBG.

The driving unit 140a may cause the vehicle or the autonomous driving vehicle 100 to drive on a road. The driving unit 140a may include an engine, a motor, a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

Examples of AR/VR and Vehicle to which the Present Invention is Applied

Figure 18:
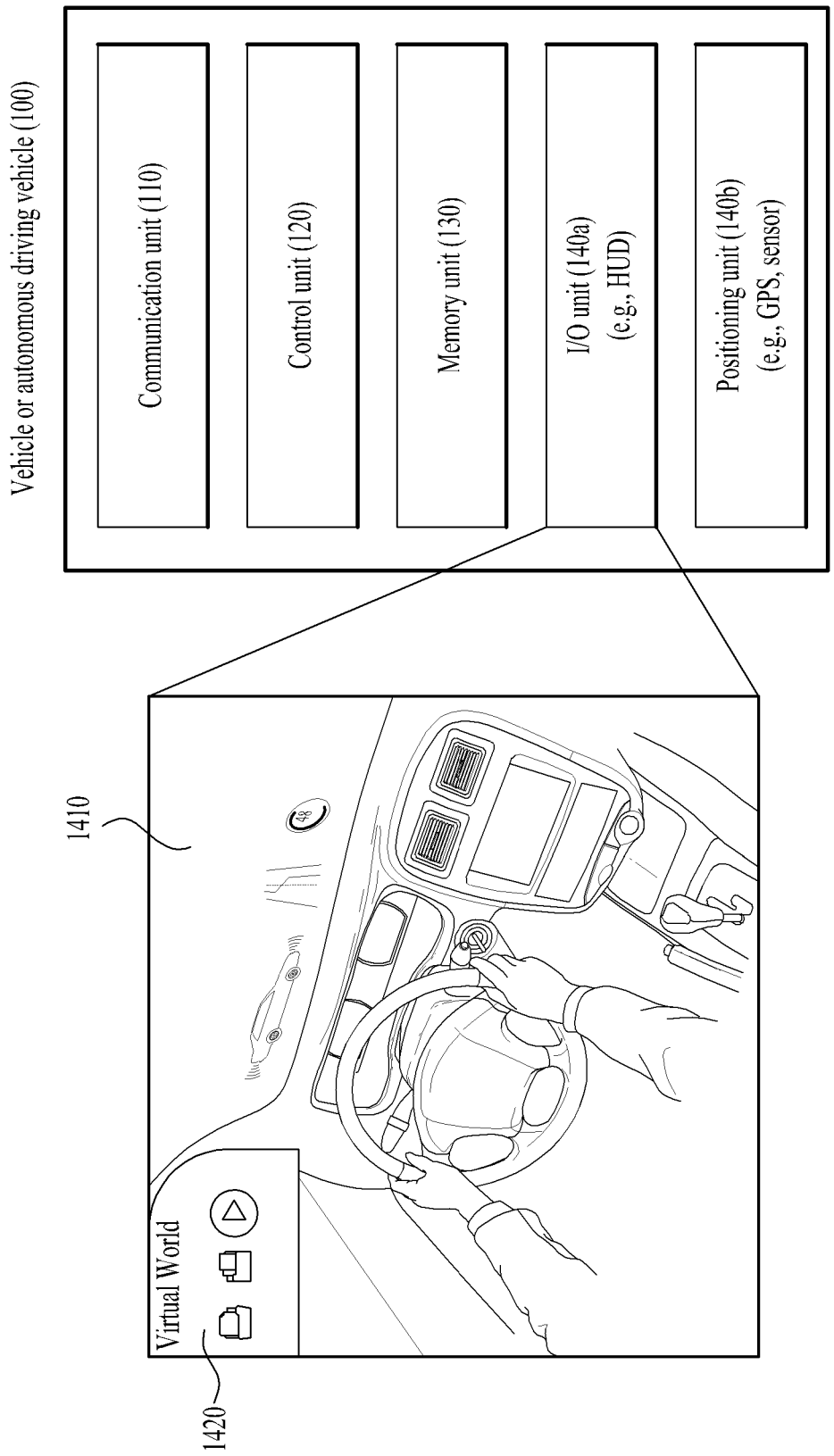
FIG. 18 illustrates a vehicle applied to the present invention.

FIG. 18 illustrates a vehicle applied to the present invention. The vehicle may be implemented as a transport means, an aerial vehicle, a ship, etc.

Referring to FIG. 18, a vehicle 100 may include a communication unit 110, a control unit 120, a memory unit 130, an I/O unit 140a, and a positioning unit 140b. Herein, the blocks 110 to 130/140a and 140b correspond to blocks 110 to 130/140 of FIG. 15.

The communication unit 110 may transmit and receive signals (e.g., data and control signals) to and from external devices such as other vehicles or BSs. The control unit 120 may perform various operations by controlling constituent elements of the vehicle 100. The memory unit 130 may store data/parameters/programs/code/commands for supporting various functions of the vehicle 100. The I/O unit 140a may output an AR/VR object based on information within the memory unit 130. The I/O unit 140a may include an HUD. The positioning unit 140b may acquire information about the position of the vehicle 100. The position information may include information about an absolute position of the vehicle 100, information about the position of the vehicle 100 within a traveling lane, acceleration information, and information about the position of the vehicle 100 from a neighboring vehicle. The positioning unit 140b may include a GPS and various sensors.

As an example, the communication unit 110 of the vehicle 100 may receive map information and traffic information from an external server and store the received information in the memory unit 130. The positioning unit 140b may obtain the vehicle position information through the GPS and various sensors and store the obtained information in the memory unit 130. The control unit 120 may generate a virtual object based on the map information, traffic information, and vehicle position information and the I/O unit 140a may display the generated virtual object in a window in the vehicle (1410 and 1420). The control unit 120 may determine whether the vehicle 100 normally drives within a traveling lane, based on the vehicle position information. If the vehicle 100 abnormally exits from the traveling lane, the control unit 120 may display a warning on the window in the vehicle through the I/O unit 140a. In addition, the control unit 120 may broadcast a warning message regarding driving abnormity to neighboring vehicles through the communication unit 110. According to situation, the control unit 120 may transmit the vehicle position information and the information about driving/vehicle abnormality to related organizations.

The above-described embodiments are combinations of elements and features of the present disclosure in prescribed forms. The elements or features may be considered as selective unless specified otherwise. Each element or feature may be implemented without being combined with other elements or features. Further, the embodiment of the present disclosure may be constructed by combining some of the elements and/or features. The order of the operations described in the embodiments of the present disclosure may be modified. Some configurations or features of any one embodiment may be included in another embodiment or replaced with corresponding configurations or features of the other embodiment. It is obvious to those skilled in the art that claims that are not explicitly cited in each other in the appended claims may be presented in combination as an embodiment of the present disclosure or included as a new claim by a subsequent amendment after the application is filed.

In this document, the embodiments of the present disclosure are mainly described based on a signal transmission and reception relationship between the BS and UE. The signal transmission and reception relationship may be equally/similarly applied to signal transmission between the UE and relay or signal transmission between the BS and relay. A specific operation described as performed by the BS may be performed by an upper node of the BS. That is, it is apparent that various operations for communication with the UE may be performed by the BS or other network nodes rather than the BS in a network including a plurality of network nodes including the BS. The term 'base station' may be replaced with 'fixed station', 'Node B', 'eNode B (eNB)', 'gNode B (gNB)', 'access point (AP)', etc. The term 'terminal' may be replaced with 'user equipment (UE)', 'mobile station (MS)', 'mobile subscriber station (MSS)', etc.

The embodiments of the present disclosure may be achieved by various means, for example, hardware, firmware, software, or any combination thereof. In a hardware configuration, the embodiments of the present disclosure may be achieved by at least one of application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, the embodiments of the present disclosure may be implemented in the form of a module, a procedure, a function, etc. for performing the above-described functions or operations. Software code may be stored in the memory and executed by the processor. The memory is located at the interior or exterior of the processor and may transmit and receive data to and from the processor via various known means.

Those skilled in the art will appreciate that the present disclosure may be carried out in other specific ways than those set forth herein without departing from the essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

The above-described embodiments of the present disclosure are applicable to various mobile communication systems.

What is claimed is:

1. A method of measuring a Channel Occupancy Ratio (CR) by a first user equipment in a wireless communication system, the method comprising:
   transmitting by the first user equipment a signal to a second user equipment; and
   measuring by the first user equipment the channel occupancy ratio based on a resource amount for signal transmission,
   wherein the channel occupancy ratio is measured based on at least one of a scaling value or a bias value configured based on a result from comparing a transmission power for the signal transmission and a threshold with each other.

2. The method of claim 1, wherein based on the transmission power less than the threshold, the scaling value greater than 0 and smaller than 1 is used and wherein based on the transmission power equal to or more than the threshold, the scaling value of 1 is used.

3. The method of claim 1, further comprising:
   receiving information indicating scaling values respectively mapped for a plurality of transmission power ranges from a base station; and
   measuring the channel occupancy ratio based on the scaling value selected based on the information.

4. The method of claim 1, wherein the at least one of the scaling value or the bias value is determined based on a type or priority of a service related to the transmitted signal.

5. The method of claim 1, further comprising:
   measuring an average transmission power during a time interval for measuring the channel occupancy ratio; and
   measuring the channel occupancy ratio based on the measured average transmission power.

6. The method of claim 1, wherein the channel occupancy ratio is measured based on a size of a coverage of the first user equipment.

7. The method of claim 6, further comprising receiving control information indicating at least one of a distance between the first user equipment and the second user equipment or success/failure in signal reception from the second user equipment through physical layer signaling or higher layer signaling.

8. The method of claim 6, wherein the coverage is calculated in consideration of at least one of the transmission power, Modulation and Coding Scheme (MCS), or a payload size.

9. The method of claim 1, wherein the channel occupancy ratio is measured in further consideration of a resource for reception of a feedback signal for the transmitted signal.

10. A first user equipment measuring a Channel Occupancy Ratio (CR) in a wireless communication system, the first user equipment comprising:
    a transceiver; and
    a processor configured to transmit a signal to a second user equipment and measure the channel occupancy ratio based on a resource amount for signal transmission,
    wherein the channel occupancy ratio is measured based on at least one of a scaling value or a bias value configured based on a result from comparing a transmission power for the signal transmission and a threshold with each other.

11. The first user equipment of claim 10, wherein the first user equipment communicates with at least one of a mobile terminal, a network, or an autonomous vehicle other than the device.

12. The first user equipment of claim 10, wherein the first user equipment implements at least one Advanced Driver Assistance System (ADAS) function based on a signal for controlling a motion of the first user equipment.

13. The first user equipment of claim 10, wherein the first user equipment receives a user's input so as to switch a driving mode of a device from an autonomous driving mode to a manual driving mode, and vice versa.

14. The first user equipment of claim 10, wherein the first user equipment is driven autonomously based on external object information and wherein the external object information includes at least one of information on presence of non-presence of an object, location information of the object, distance information between the first user equipment and the object, and relative speed information between the first user equipment and the object.

15. The first user equipment of claim 10, wherein the first user equipment is capable of communicating with at least one of another user equipment, a user equipment related to autonomous driving vehicle, a base station, or a network.

* * * * *